(12) United States Patent
Zhu et al.

(10) Patent No.: US 12,121,890 B2
(45) Date of Patent: *Oct. 22, 2024

(54) LIGHT PARTICLE OR MIXED PARTICLE SYSTEM FOR WASTEWATER TREATMENT

(71) Applicant: Wesdon-Tienda Environmental Sciences Co. Ltd., Tianjin (CN)

(72) Inventors: Jingxu Zhu, London (CA); Yuanyuan Shao, London (CA); Keying Ma, Tianjin (CN); Lin Wang, Tianjin (CN); George Nakhla, Woodbridge (CA)

(73) Assignee: WESDON-TIENDA ENVIRONMENTAL SCIENCES CO. LTD., Tianjin (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/940,568

(22) Filed: Mar. 29, 2018

(65) Prior Publication Data

US 2018/0280907 A1    Oct. 4, 2018

(30) Foreign Application Priority Data

Mar. 29, 2017  (CN) .......................... 201710197479.6
Mar. 29, 2017  (CN) .......................... 201710198025.0
(Continued)

(51) Int. Cl.
*B01J 8/22* (2006.01)
*C02F 3/30* (2023.01)

(52) U.S. Cl.
CPC .............. *B01J 8/226* (2013.01); *C02F 3/308* (2013.01); *B01J 2208/0084* (2013.01); *B01J 2208/00867* (2013.01); *Y02W 10/10* (2015.05)

(58) Field of Classification Search
CPC .... C02F 1/70; C02F 1/68; C02F 1/586; C02F 3/2893; C02F 3/2873; C02F 3/2813;
(Continued)

(56) References Cited

U.S. PATENT DOCUMENTS 5,486,291 A * 1/1996 Todd .................. C02F 3/00
                                                 210/602
7,736,513 B2 * 6/2010 Zhu .................. C02F 3/085
                                                 210/603
(Continued)

FOREIGN PATENT DOCUMENTS

CN          2791030 Y  *  6/2006
CN       102730819 A  *  10/2012
(Continued)

OTHER PUBLICATIONS

Lin et al, English machine Translation, CN 2791030Y, pp. 1-5 (Year: 2006).*

*Primary Examiner* — Claire A Norris
(74) *Attorney, Agent, or Firm* — HILL & SCHUMACHER

(57) ABSTRACT

The present disclosure provides a light particle system or a mixed particle system for wastewater treatment comprising a contactor. The contactor includes a gas-liquid-solid three-phase region, and the gas-liquid-solid three-phase region includes gas phase, liquid phase, and solid phase. The liquid phase is a continuous phase and the solid phase is light particles or mixed particles. The mixed particles include light particles and heavy particles. The density of the light particles is lower than the density of the liquid phase and the density of the heavy particles is higher than the density of the liquid phase. The light particles or mixed particles are able to carry some microorganisms on their surfaces at least. The light/mixed particle-suspension system in the present invention applied in wastewater treatment can increase the concentration of microorganisms significantly, improve the ability to bear impact load, produce less sludge, and without sludge expansion. The ability to suspend particles under the combined effect of gas and liquid is able to reduce energy
(Continued)

consumption to a larger extent. Therefore, this system features both high efficiency and low energy consumption.

8 Claims, 12 Drawing Sheets

(30) Foreign Application Priority Data

Mar. 29, 2017 (CN) .......................... 201710199428.7
Mar. 29, 2017 (CN) .......................... 201710199429.1
Mar. 29, 2017 (CN) .......................... 201710206300.9

(58) Field of Classification Search
CPC ........ C02F 3/1252; C02F 3/301; C02F 3/085;
C02F 3/34; C02F 3/2833; C02F 3/2806;
C02F 3/109; C02F 3/18; C02F 3/1242;
C02F 3/121; C02F 3/006; C02F 3/308;
C02F 2203/008; C02F 2203/006; C02F
2209/22; C02F 2209/06; C02F 2003/001;
B01D 21/0003; B01D 21/10; B01D
21/0057; B01D 21/0045; B01D 2221/08;
B01D 2221/02; Y02W 10/15; B01J
8/226; B01J 2208/00867; B01J 2208/0084
USPC ....... 210/605, 150, 630, 615, 747.5, 170.01,
210/170.02, 170.09
See application file for complete search history.

(56) References Cited

U.S. PATENT DOCUMENTS 8,551,341 B2 * 10/2013 Conner .................... B01F 5/10
210/739
2016/0115056 A1 * 4/2016 Olesen ..................... C02F 3/22
210/615

FOREIGN PATENT DOCUMENTS

KR          100789881 B1 * 2/2008
WO   WO-2007042836 A1 * 4/2007 ................ C02F 3/06

* cited by examiner

LIGHT PARTICLE OR MIXED PARTICLE SYSTEM FOR WASTEWATER TREATMENT

FIELD

The present disclosure relates to wastewater treatment, and more particularly the present disclosure relates to a light particle system and a mixed particle system for wastewater treatment.

BACKGROUND

With the population growth and economic development, the demand for water increases and so as the discharge of wastewater, leading to the shortage of water resources. Currently, more and more companies start to utilize green technologies to improve water quality by reducing waste production. However, the effects are not that obvious. In order to achieve the sustainable development of water resources, it is obliged to treat wastewater and turn it into usable water. Therefore, wastewater treatment technologies are very important. Especially, due to the lack of onsite wastewater treatment technologies in the present, wastewater cannot be treated effectively and in time. The consequence is severer water pollution and gradual deteriorating of water quality.

Wastewater mainly consists of domestic wastewater, industrial wastewater, livestock farm wastewater, agricultural wastewater, etc. The major indicators of wastewater include chemical oxygen demand (COD), biochemical oxygen demand (BOD), ammonia nitrogen, and total phosphorus. Wastewater contains a variety of nutrients facilitating the growth of aquatic plants, pathogenic microorganisms which may cause diseases, and toxic chemical compounds that can be carcinogenic or mutagenic. Therefore, from the perspective of protecting human health and the environment, wastewater must be treated before reuse or discharge. A variety of methods for wastewater treatment can be divided into four categories in terms of mechanisms: physical treatment, chemical treatment, physicochemical treatment, and biological treatment. These methods can be applied together when treating wastewater, wherein the biological treatment is the most economical, effective and widely-used method.

Fluidization technology is a type of novel process for wastewater treatment, featuring with high load and high efficiency. It combines the traditional activated sludge process with the biofilm process and introduces the fluidization technology in chemical engineering. By means of fluidization, microorganisms attach to the solid particles and solid particles are suspended in the wastewater system. Since the relatively large specific surface areas of particles are able to increase the concentration of microorganisms in the system, the efficiency of wastewater treatment will be improved and the entire system will have high organic load and low sludge yield. In the applications of fluidization, the selection of solid particles is the key factor affecting the efficiency of wastewater treatment. Traditional fluidization systems usually adopt heavy particles much denser than water as the solid phase, where maintaining the fluidization of heavy particles requires large energy consumption and high liquid reflux ratio. Therefore, the current need is to find suitable solid particles and suitable means for particle dispersion for the application in the fluidization wastewater treatment in order to save energy.

SUMMARY

It is the object of the present disclosure to provide a light particle or mixed particle system and its apparatus for wastewater treatment to overcome the shortcomings of existing technologies.

The present disclosure provides a light particle suspension system.

Injecting gas into the wastewater treatment system lowers the average density of the gas-liquid mixture. When the average density of the mixed fluid is close or equal to the density of light particles, the slight disturbance of gas flow is capable of dispersing the light particles in the liquid. This disclosure enables the sufficient interphase contacted between gas, liquid and solid as well as reduces energy consumption.

The present disclosure provides a mixed particle suspension system. After adding the mixture of light particles and heavy particles into the suspension system, light particles float on the top of the system while heavy particles sink to the bottom of the system. With the effect of gas and liquid, light particles at the top are dispersed downward and heavy particles at the bottom are fluidized upward. Therefore, more uniform axial distribution of mixed particles can be achieved in the system by relatively small driving force, which improves the contact efficiency between gas, liquid and solid as well as the effective use of space and energy-saving.

The present disclosure provides a light particle wastewater treatment apparatus containing one or more biological reaction zone(s). The biological reaction zone(s), which are light particle or mixed particle systems, can be one or a combination of two or multiple of the anaerobic zone, the anoxic zone, and the aerobic zone. The light particle or mixed particle system includes particles acting as the carrier of microbiota and the principle is to benefit the growth of microbiota. Moreover, the operation mode is free suspension or gas-aid suspension, and the liquid in two or more of the biological reaction zones is mutually connected. The light particle or mixed particle system in this apparatus applied in wastewater treatment can increase the concentration of microorganisms significantly, improve the ability to bear impact load, produce little excess sludge, while without sludge expansion. Meanwhile, the means to suspend particles by gas is able to reduce energy consumption. Therefore, this system features with high efficiency and low energy consumption.

To attain the above objectives, the present disclosure discloses the following technical solutions:

A light-/mixed-particle system for wastewater treatment comprising a contactor. The contactor includes a gas-liquid-solid three-phase region and the gas-liquid-solid three-phase region includes gas phase, liquid phase, and solid phase. The contactor includes at least one biological reaction zone and said one biological reaction zone being one of the anaerobic zone, anoxic zone and aerobic zone. The liquid phase is the continuous phase and the solid phase is light particles or mixed particles. The mixed particles include light particles and heavy particles. The density of the light particles is lower than the density of the liquid phase, and the density of the heavy particles is higher than the density of the liquid phase. The light and heavy particles have uniform or non-uniform particle size and density. The light particles or mixed particles are able to carry some microorganisms on their surfaces at least.

Compared to the existing technology, the present disclosure has the following advantages: injecting gas into the liquid phase disperses particles in the liquid by lowering the fluid density of the gas-liquid mixture. Relatively large specific surface areas of particles provide adequate space for the attachment of microorganisms and benefit the sufficient contact between the microorganisms and wastewater, accelerating the biochemical reactions. Therein contains a particle suspension system for wastewater treatment, increasing the concentration of microorganisms significantly, improving the ability to bear impact load, producing less sludge, and minimizing sludge expansion. Meanwhile, the means to suspend particles by gas and liquid can reduce energy consumption to a larger extent. Therefore, this system features with high efficiency and low energy consumption.

The present disclosure provides a system for wastewater treatment. The system comprises a contactor enclosing a chamber, said chamber including a liquid phase and light particles in the liquid phase. A density of the light particles is lower than a density of the liquid phase and the light particles have microorganisms located on their surfaces. The system includes a gas injection mechanism for injecting gas into the chamber located near a bottom of the chamber to inject gas upwardly into the liquid phase containing the light particles located in the chamber thereby lowering an average density of the gas-liquid mixture to cause the light particles to be uniformly dispersed in the chamber by the gas when the gas is being injected into the chamber. The gas injection mechanism is configured so that the gas phase flows upwardly in the chamber continuously or intermittently.

The present disclosure provides a process for wastewater treatment using a light particle system including steps of feeding wastewater into the light particle system which comprises a contactor enclosing a chamber. The chamber includes a liquid phase and light particles in the liquid phase with the density of the light particles being lower than a density of the liquid phase, and the light particles having microorganisms located on their surfaces. The system includes a gas injection mechanism for injecting gas into the chamber located near a bottom of the chamber to inject gas upwardly into the liquid phase containing the light particles located in the chamber thereby lowering an average density of the gas-liquid mixture to cause the light particles to be uniformly dispersed in the chamber by the gas when the gas is being injected into the chamber. The gas injection mechanism is configured so that the gas phase flows upwardly in the chamber continuously or intermittently. The method includes discharging the treated wastewater from the light particle system.

A further understanding of the functional and advantageous aspects of the present disclosure can be realized by reference to the following detailed description and drawings.

BRIEF DESCRIPTION OF THE DRAWINGS

Embodiments disclosed herein will be more fully understood from the following detailed description thereof taken in connection with the accompanying drawings, which form a part of this application, and in which.

The meanings of the labels in FIG. 5 are: 1. anoxic zone; 2. aerobic zone; 3. high-efficiency packing; 4. Aeration tubes; 5. Light particles; 6. Air; 7. Wastewater feed; 8-10. Pipes

Figure 9:
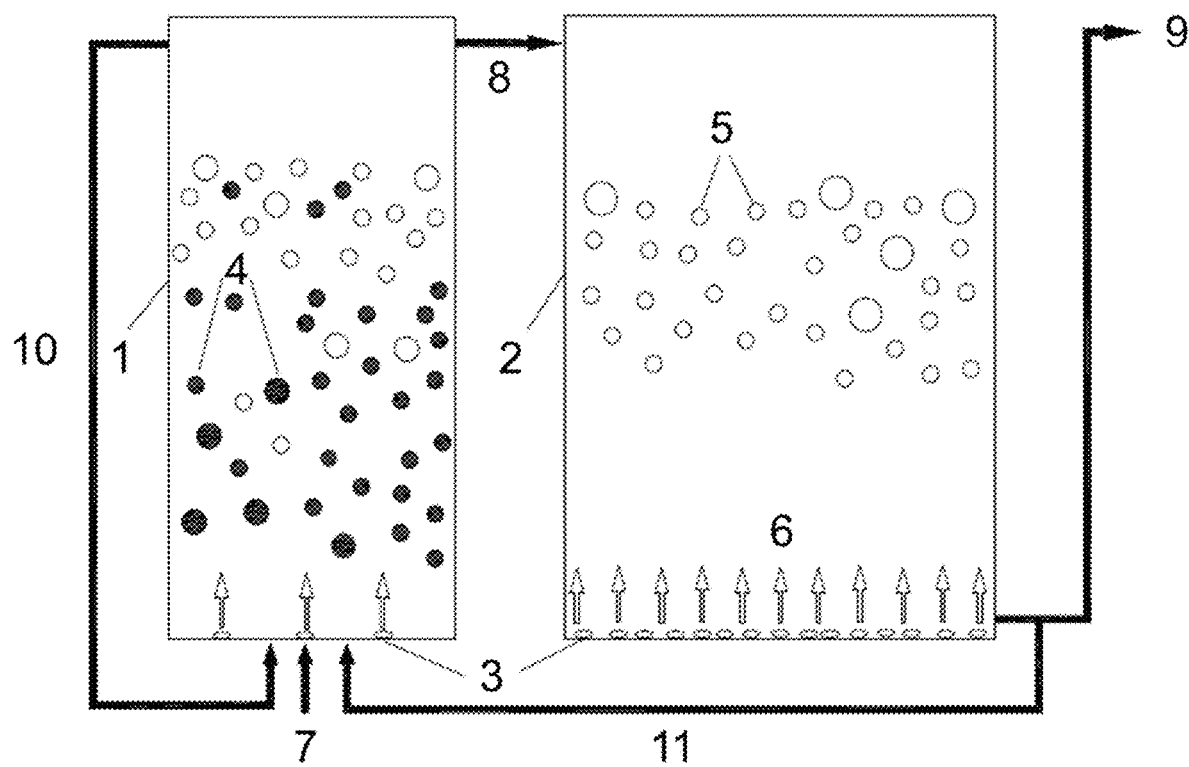
FIG. 9 is an embodiment of the apparatus using the mixed particle system to treat wastewater.

The meanings of the labels in FIG. 9 are: 1. is an anoxic zone; 2. is an aerobic zone; 3. are aeration tubes 4. are heavy particles; 5. are light particles; 6. is air; 7. is wastewater; 8, 9, 10, 11 are pipes.

Figure 10:
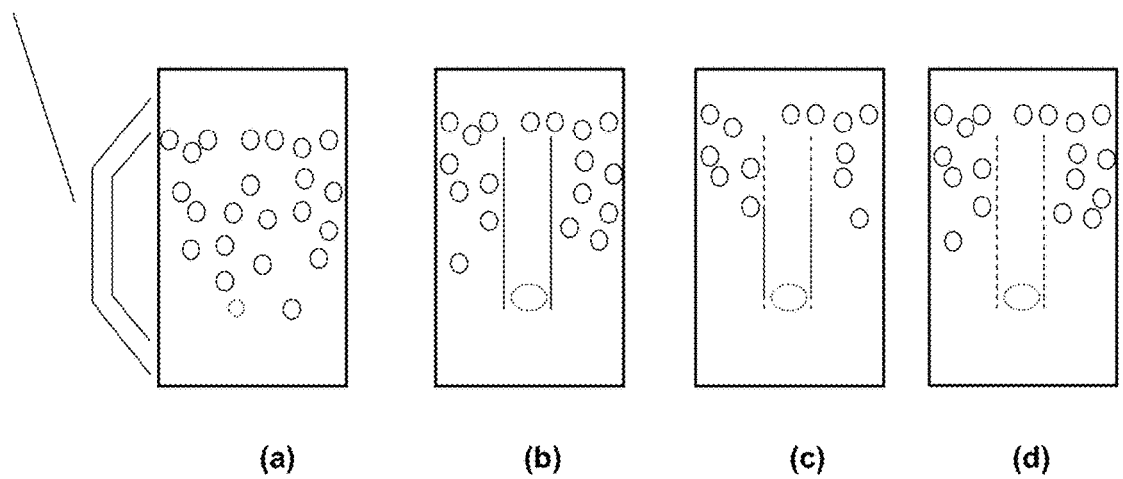

FIG. 10 is the schematic diagram of the coordinating setup of pipes and gas distributors in the light particle suspension system.

Figure 11:
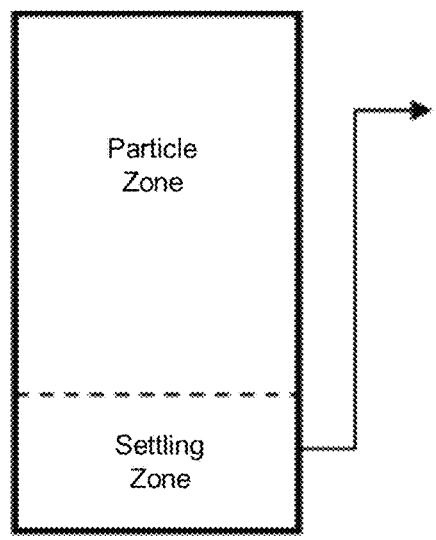

FIG. 11 is the schematic diagrams of bioreaction zone including settling zone.

Figure 12:
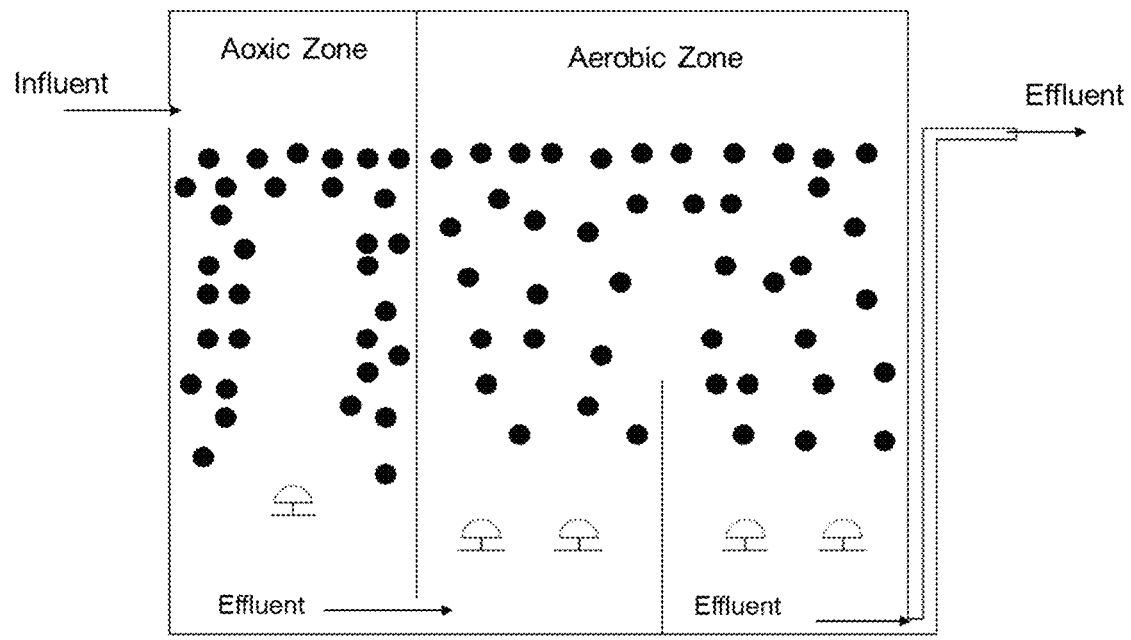

FIG. 12 is the first embodiment of the apparatus for treating wastewater.

Figure 13:
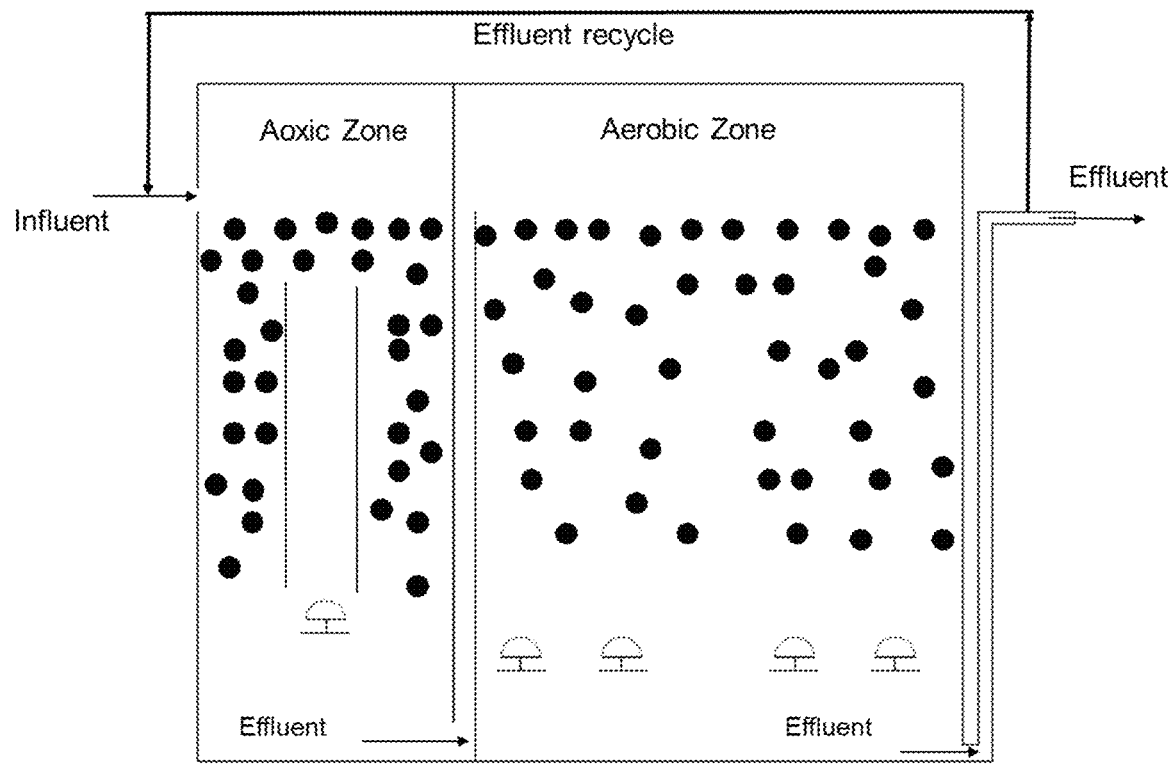

FIG. 13 is another apparatus diagram of treating wastewater.

Figure 14:
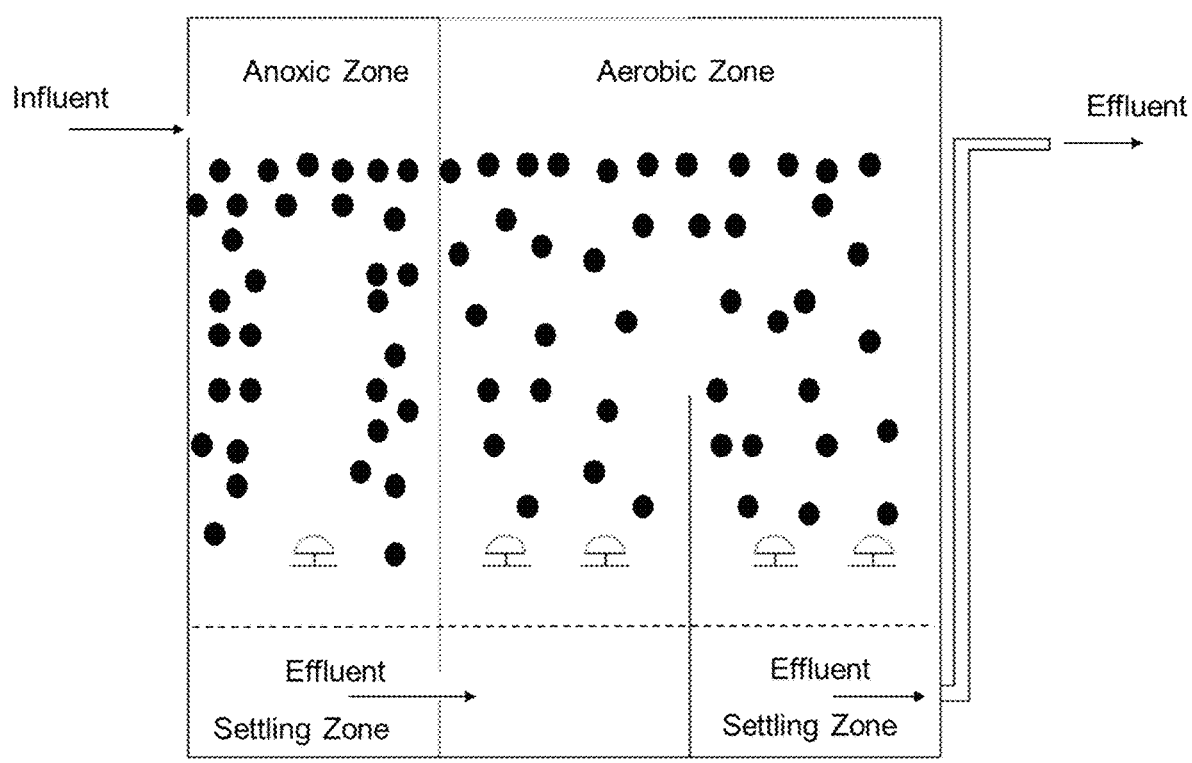

FIG. 14 is the second embodiment of the apparatus for treating wastewater including settling zone.

Figure 15:
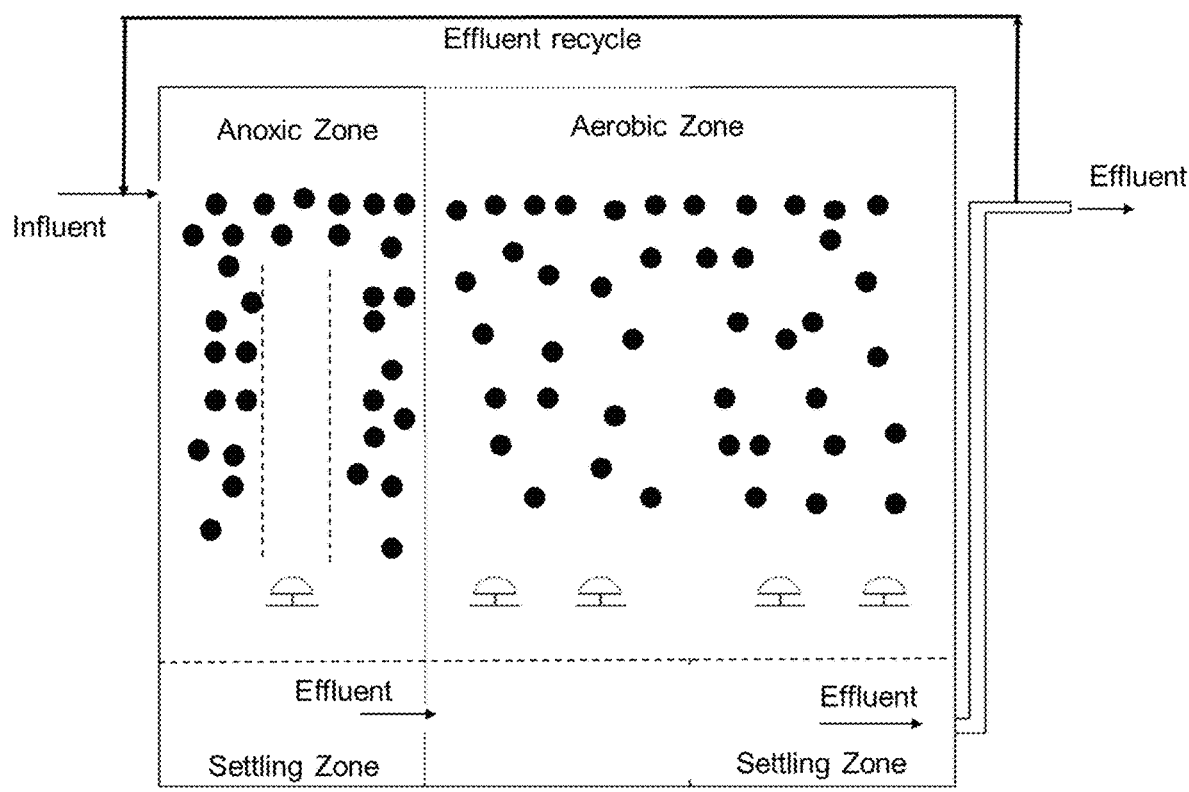

FIG. 15 is another apparatus diagram of treating wastewater including settling zone.

DETAILED DESCRIPTION

Various embodiments and aspects of the disclosure will be described with reference to details discussed below. The following description and drawings are illustrative of the disclosure and are not to be construed as limiting the disclosure. The drawings are not to scale. Numerous specific details are described to provide a thorough understanding of various embodiments of the present disclosure. However, in certain instances, well-known or conventional details are not described in order to provide a concise discussion of embodiments of the present disclosure.

As used herein, the terms "comprises" and "comprising" are to be construed as being inclusive and open ended, and not exclusive. Specifically, when used in the specification and claims, the terms "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" are meant to cover variations that may exist in the upper and lower limits of the ranges of values, such as variations in properties, parameters, and dimensions.

As used herein, the phrase "light particles" refers to particles having a density in a range which is higher than about 80% of the density of the liquid and lower than the liquid density.

As used herein, the phrase "heavy particles" refers to a particles having a density in a range which is higher than the liquid density and lower than or equal to about 120% of the liquid density.

As used herein, the phrase "mixed particles" or "mixed particle system" refers to a mixture of both light and heavy particles in which the density of the light particles is higher than or equal to about 80% of the density of the liquid phase and lower than the density of the liquid phase, and the density of the heavy particles is higher than the density of the liquid phase and lower than or equal to about 120% of the density of the liquid phase.

As used herein, the term "microorganisms" refers to microscopic organisms which may exist in the wastewater and biological wastewater treatment systems. In particular, the microbial culture of the biological wastewater treatment system includes both heterotrophic and autotrophic bacteria of the types observed in conventional activated sludge processes. The heterotrophic bacteria is primarily responsible for the biodegradation of organics, denitrification, and phosphorous uptake etc. and include but are not limited to various *Pseudomonas, Clostridium, Bacillus*, and *Salmonella* species, *Actinomyces, Acinetobacter, Corynebacterium, Escherichia Coli, Klebisella, Staphylcocus, Streptococcus, Vibrio Cholerae*. The autotrophic bacteria, that utilizes inorganic carbon predominantly in the form of alkalinity, is primarily responsible for nitrification in the process and consists of bacteria such as *Nitrosomonas, Nitrobacter, Nitrosococus*, and *Nitrospira*. It is noted that the biofilms attached on the media usually comprise both heterotrophic and autotrophic bacteria.

To better understand the light particle or mixed particle system for wastewater treatment, the present invention will be illustrated as follows.

In an embodiment, the present disclosure discloses a light particle or mixed particle system for wastewater treatment, comprising a contactor. The contactor includes a gas-liquid-solid three-phase region and the gas-liquid-solid three-phase region includes gas phase, liquid phase, and solid phase. The liquid phase is the continuous phase and the solid phase is light particles or mixed particles. The mixed particles include light particles and heavy particles. The density of the light particles is lower than the density of the liquid phase and the density of the heavy particles is higher than the density of the liquid phase. The light particles or heavy particles have uniform or non-uniform particle sizes and/or density. The light particles or mixed particles are able to carry some microorganisms on their surfaces at least.

It is easy to understand that when using the system for wastewater treatment, the contactor contacts with the wastewater treated by the particle suspension system to implement wastewater treatment. This embodiment creatively combines the characteristics of three aspects, including sufficient contact between gas, liquid and solid, easy suspension of light particles in the liquid, and light particles being able to carry microorganisms on their surface at least. Moreover, adding mixed particles forms a distribution gradient in the vertical direction as well as benefits the contact and mass transfer during the wastewater treatment process. As a result, when the system is applied to wastewater treatment, relatively large surface areas of particles provide adequate space for microorganisms to attach. Since microorganisms grow and shed on the surface of suspended particle media and renew continuously, the concentration of microorganisms in the system can be increased effectively. Hence, it would be easy for microorganisms to produce metabolic degradation reaction with organic pollutants, and/or nitration and denitrification with ammonia nitrogen, and/or phosphorus release and uptake, which promotes the efficiency of wastewater treatment. In addition, this embodiment may select microorganisms corresponding to the features of specific wastewater.

Injecting gas or liquid into the above system (can also be both gas and liquid), light particles in the system are liable to be fluidized and more uniformly dispersed in the system by the liquid or gas (can also by the gas-liquid mixture). Meanwhile, microorganisms carried by the particles move around with the motion of particles so as to treat the surrounding wastewater. It is easy to understand that the gas or liquid is mainly used to flow the particles. Thus, the liquid can be untreated wastewater or other liquid besides untreated wastewater as long as such liquid does not hinder or go against wastewater treatment. The gas is normally air but can be other types of gases and gases containing oxygen also provide oxygen necessary for certain biological processes such as aerobic reactions. If the microbial content is high and system control is easy, it would take few efforts to increase the capacity of the system for wastewater treatment.

Especially, the light particles or mixed particles may possess one or more micropores in which microorganisms are enriched before or during the process of wastewater treatment. Furthermore, the light particles or mixed particles can include micropores and one or more cavities connecting to the micropores at the same time. Microorganisms are enriched inside the cavities in advance and contact with wastewater to perform mass transfer via micropores. The microorganisms can be carried by particles before wastewater treatment or exist in the wastewater and enriched during the treatment.

For the light particle suspension system, after adding light particles into the continuous liquid phase, light particles will float at the top of the liquid at static state (the top of the system is the free interface) since the density of the light particles is lower than the liquid. The liquid can be fed to the system continuously or intermittently from the top or bottom of the apparatus. If a constant liquid level is needed, an overflow weir may be added or other enforceable schemes may be adopted. Furthermore, gas enters the system after being distributed by gas distributors. As the gas velocity increases, the average density of the gas-liquid fluid decreases. When the average density decreases close or equal to the density of light particles, a slight disturbance of the fluid can cause suspension of light particles in the system. As the density of solid particles is lower than the density of the liquid, only the upward buoyancy on the particles caused by the liquid needs to be overcome to maintain the suspension of light particles. Thus, fluidization can be realized easily through particle dispersion and the energy consumption would be low.

For the mixed particle suspension system at the static state, light particles float on the top of the liquid by the buoyancy and heavy particles settle at the bottom of the system by their own gravity (the top of the system is the free interface). Liquid can be added into the system continuously or intermittently from the top or bottom. To maintain a constant liquid level, overflow weirs or other additional enforceable solutions may be used. Moreover, gas is injected from the bottom of the apparatus and enters the system after being distributed by the gas distributors. As the gas velocity increases to a first critical gas velocity, light particles at the upper layer expand downward and stay suspended. When a second critical gas velocity is reached, heavy particles at the lower layer expand upward and stay suspended due to the drag force applied by the upward gas. As long as choosing the suitable operating gas velocity, that is larger than the first critical velocity and the second critical velocity but lower than the entrainment velocities of both the light particle and the heavy particle, the mixed particles would expend from two ends of the system towards the center and occupy the entire system, showing high efficiency of space utilization. The first critical gas velocity refers to the superficial gas velocity that the light particles achieve partial suspension in the system. The second critical gas velocity refers to the superficial gas velocity that the heavy particles achieve partial suspension in the system. The first critical gas velocity and the second critical gas velocity are not distinguished by magnitude.

The liquid may be selectively fed into the system from the top or bottom of the apparatus. If the top liquid inlet is used, the introduction of liquid can promote the fluidization of the light particles. If the bottom liquid inlet is used, the introduction of the liquid can promote the fluidization of the heavy particles. The feeding method of liquid can be intermittent or continuous depending on different industrial applications. In the practical application, an appropriate liquid feeding method and speed should be chosen based on the specific circumstances so that the mixed particles are more uniformly dispersed in the system with the effect of gas or gas-liquid fluid.

Figure 1A:
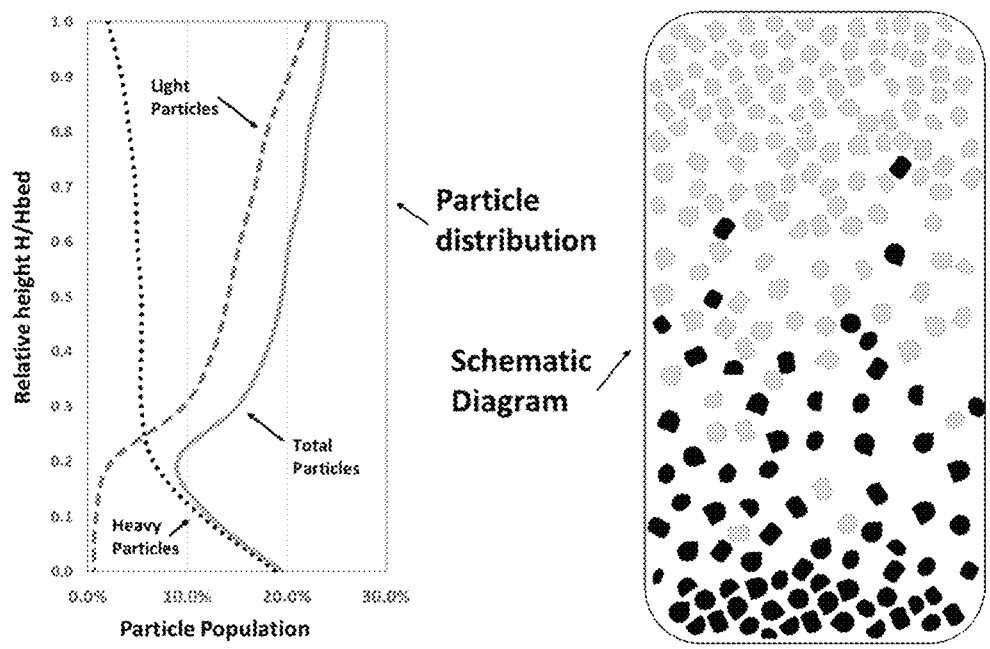
FIG. 1(a) shows the vertical distributions of the light and heavy particles in the system, at a relatively low gas velocity just above the two critical gas velocities of the light and heavy particles.
Figure 1B:
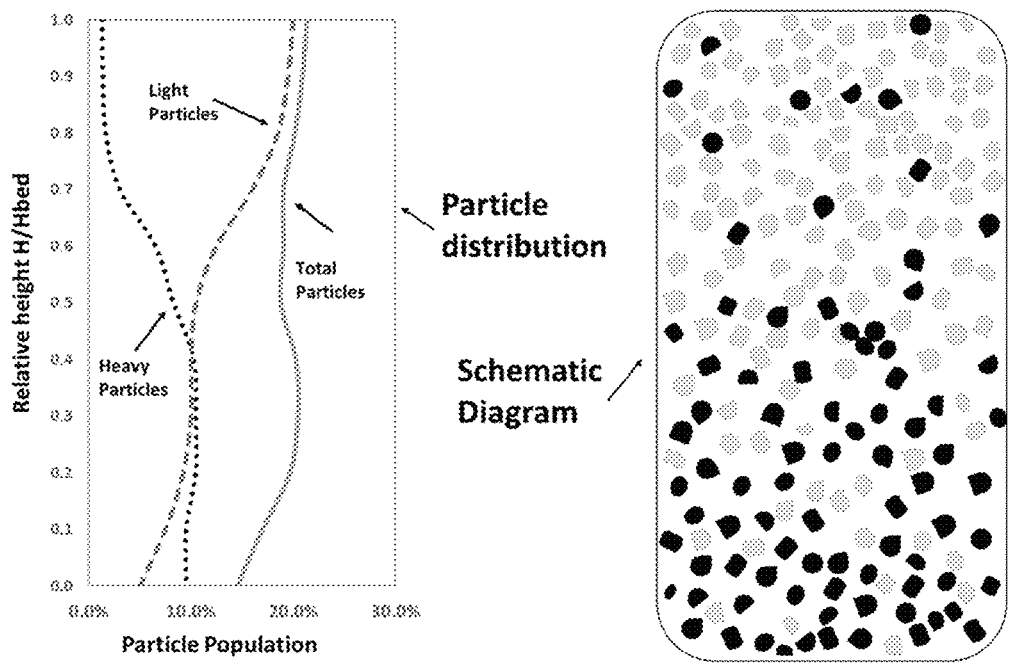
FIG. 1(b) shows the vertical distributions of the light and heavy particles in the system, at a gas velocity in-between the gas velocities applied for those shown FIG. 1(a) and FIG. 1(c).
Figure 1C:
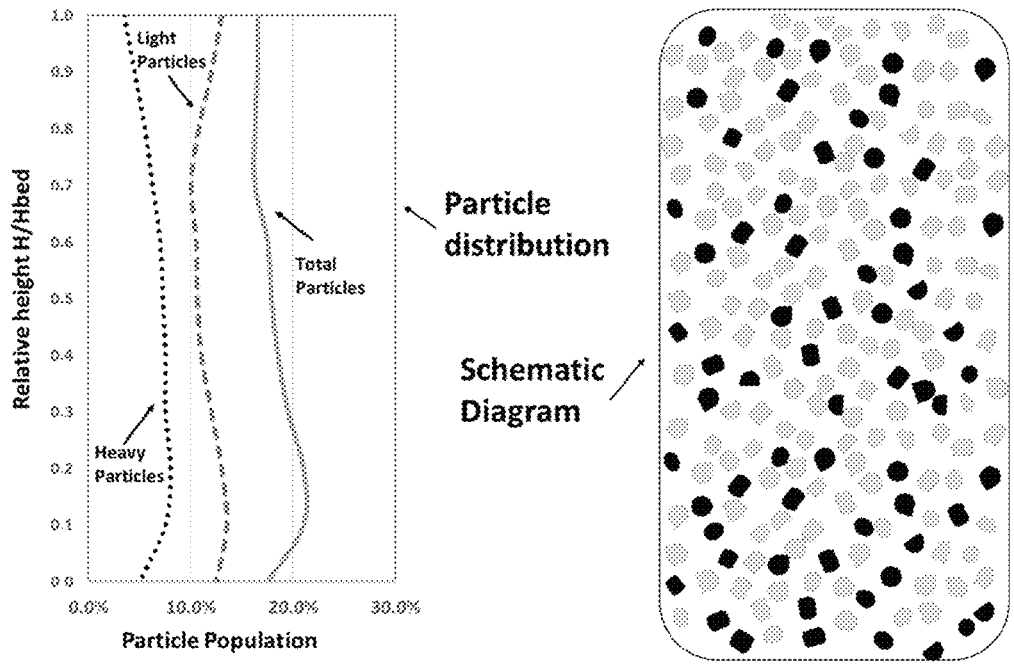
FIG. 1(c) shows the vertical distributions of the light and heavy particles in the system, at a gas velocity significantly higher than the two critical gas velocities of the light and heavy particles, but well below the two entrainment velocities of the light and heavy particles.

In another embodiment, FIGS. 1(a) to 1(c) shows the progressively increased axial uniformity for the vertical distribution of mixed light and heavy particles, for a system with lighter particles (average size 3 mm and average density 930 kg/m$^3$) and heavy particles (average size 3 mm and average density 1050 kg/m$^3$). In between the higher of the first and the second critical velocities, and the lower of the entrainment velocities of the light and the heavy particles, the light and the heavy particles would expend from two ends of the system towards the center, with increasing gas velocity, gradually occupying the entire system.

As shown in FIGS. 1(a), 1(b) and 1(c), increasing the gas velocity would disperse more light particles downwards and fluidize more heavy particles upwards at the same time, and the combination of light and heavy particles creates more uniform particle suspension in the vertical direction over a wide range of gas velocity, than either the light or the heavy particles alone. In another embodiment, the environment of the contactor is anaerobic, anoxic, or aerobic. Different environment is for treating different pollutants. If it is possible to composite the anaerobic, anoxic and aerobic environments, this system can be applied to assorted circumstances.

In another embodiment, the contactor includes a liquid-solid region and the liquid-solid region includes the liquid phase and solid phase. Since the gas-liquid-solid three-phase system may be faced with the situation that the gas phase is absent, a liquid-solid region is included in the contactor in this embodiment. Particularly, the above embodiment should be referred when wastewater treatment target anaerobic and/or anoxic environments or the gas adopts intermittent aeration or no aeration instead of continuous supply. Similarly, the solid phase of the liquid-solid region in this embodiment can be light particles, heavy particles or mixed particles, whose outer surfaces carry microorganisms. The density of light particles is lower than the density of the liquid phase while the density of heavy particles is higher than the density of the liquid phase.

In another embodiment, the gas phase flows upward continuously or intermittently. As for this embodiment, the fluid density of gas-liquid mixture decreases so that the light particles disperse in the liquid phase as uniform as possible in a light particle system. For a mixed particle system, with the effect of gas and liquid, light particles are expanded downward and suspended and heavy particles are expanded upward and suspended. Consequently, the mixed particles generate a relatively uniform distribution in the vertical direction of the system. The uniform dispersion of particles benefits the sufficient contact between microorganisms and wastewater and accelerates biochemical reactions. Gas can be fed into the system continuously or intermittently and aeration depends on oxygen requirements of the wastewater treatment system, which saves energy and increases reaction efficiency.

Moreover, in the light particle system for wastewater treatment, the density of the light particles is higher than 80% of the liquid density and lower than the liquid density. Light particles whose density is higher than 90% of the density of the liquid phase are preferred. If the density of the light particles is lower than 80% of the liquid density, the difference between the density of the light particles and the liquid density is too large for a given volume, requiring larger driving force to overcome the buoyancy of light particles and thus higher energy consumption. It is easier for light particles having a density close to the liquid density to suspend in the liquid phase. If the energy consumption is not a concern, the requirement for the density of light particles would be less restricted. In the mixed particles system, the density and size of light particles may be uniform or non-uniform. When selecting light particles based on the density, the first choice is light particles with a density higher than 80% of the liquid density and lower than the liquid density. Light particles whose density is higher than 90% of the density of the liquid phase are preferred. If the density of the light particles is lower than 80% of the liquid density, the difference between the density of the light particles and the liquid density is too large for a given volume, requiring larger driving force to overcome the buoyancy of light particles and thus higher energy consumption. It is easier for light particles having a density close to the liquid density to suspend in the liquid. When choosing light particles considering the diameter, light particles with a diameter smaller than 10 mm are preferred. The first choice would be light particles with a diameter smaller than 5 mm. The greater is the particle diameter, the smaller is the specific surface area of particles, which affects the sufficient contact and mass transfer between the gas, liquid and solid.

In the mixed particles system, the density and size of heavy particles may be uniform or non-uniform. When selecting heavy particles based on the density, the first choice is heavy particles with a density lower than or equal to 120% of the liquid density. Heavy particles whose density is lower than 110% of the liquid density is preferred. If the density of heavy particles is higher than 120% of the liquid density, the difference between the density of the heavy particles and the liquid density is too large for a given volume, requiring larger driving force to overcome the gravity of heavy particles and thus higher energy consumption. It is easier for heavy particles with a density close to the liquid density to suspend in the liquid phase. When choosing heavy particles considering the diameter, heavy particles with a diameter smaller than 10 mm are preferred. The first choice would be heavy particles with a diameter smaller than 5 mm. The greater is the particle diameter, the smaller is the specific surface area of particles. Therefore, the required minimum fluidization velocity would be higher compared to particles with the same density. This condition not only weakens the interphase contact between the gas, liquid and solid but also increases the energy consumption.

When selecting the particles, besides the density and size of particles, the material, shape and surface properties of particles are taken into account. The light particles can be plastic beads (such as polyethylene, polypropylene, foamed polystyrene, etc.), hollow glass beads, or other particles extruded using a combination of different materials. Heavy particles can be plastic beads, zeolites, or other particles extruded using a combination of different materials. The various shapes of light and heavy particles include spherical, ellipsoid, cylinder and irregular polygon. The preferable selections of particles are particles with large specific surface areas, a sphere-like shape and a density close to the liquid. They are easy to be fluidized, save energy and have relatively high mass transfer rate. Increasing the surface roughness would favour microorganism attachment and so would increased surface hydrophocility.

Preferably, the volume fraction of light particles or mixed particles in the gas-liquid-solid three-phase region should be less than or equal to 30%. Adding larger amount of particles will lower the volume fraction of the gas and liquid. Hence, it is more difficult for particles to achieve complete suspension as well as hinders sufficient contact between the three phases and mass transfer. In other cases, the decreased volume fraction of gas and liquid may lead to inadequate gas and liquid for contacting with particles, affecting the mass transfer rate between three phases.

Moreover, in the mixed particles system, loaded particles include at least one type of light particles and at least one type of heavy particles. In this way, with the effect of a certain gas velocity and liquid velocity, light particles are expanded downward and suspended and heavy particles are expanded upward and suspended. Dispersing particles more uniformly in the contactor saves energy and makes full use of space.

Preferably, in another embodiment, the volume fraction of the gas phase is less than or equal to 25% within the gas-liquid-solid three-phase region. If the volume fraction of the gas phase is too large, overcoming the drag force applied by the gas on the solid particles requires high energy consumption. Also, it is easy for bubbles to coalesce and form large bubbles in the system, causing uneven dispersion of particles and affecting the efficiency of three-phase contact reaction.

Alternatively, any location within the gas-liquid-solid three-phase region can be set up with one or more gas distributors. The arrangement of the gas distributors in the equipment is various. An optimized choice is locating the gas distributor near the bottom of the three-phase region for uniform distribution of the gas.

Figure 2:
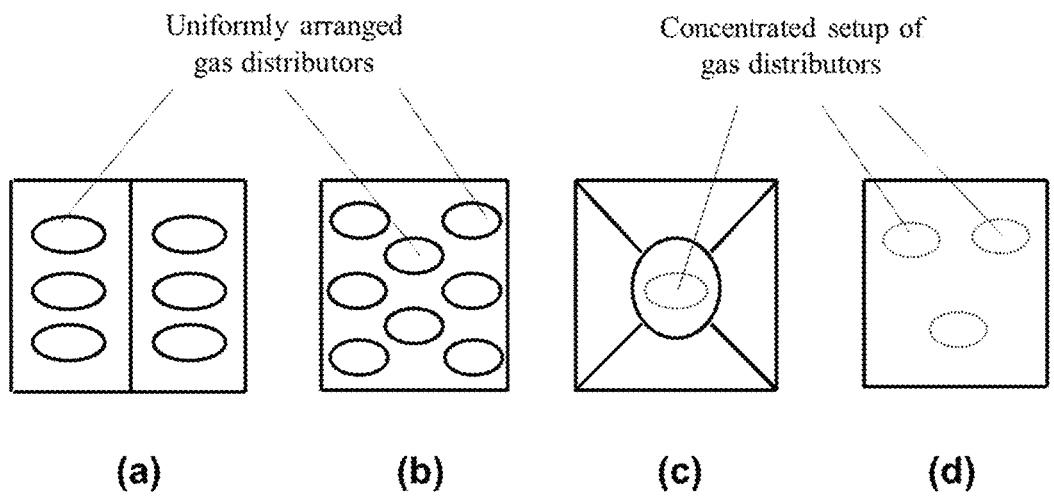
FIG. 2 is the schematic diagram of the types of one or multiple gas distributors on the cross section in the gas-liquid-solid three-phase region.

In another embodiment, the gas distributors placed near the bottom of the three-phase region can be uniformly distributed in the cross section of the system or concentrated in one or more cross-sectional zones. As shown in FIG. 2, (a) and (b) are the patterns of gas distributors being uniformly arranged in the cross section of the system, among which (a) represents the arrangement with a plate in the middle and (b) demonstrates the arrangement without any plate. (c) and (d) show the concentrated setup of gas distributors, among which (c) is the arrangement with tubes and (d) is the arrangement without tubes. When multiple gas distributors are uniformly distributed in the cross section of the system, the formed gas flow rises more uniformly, which contributes to the free suspension of light particles. When the gas distributors are located in certain zones, the gas can be driven upward through these zones in precedence so as to form rising gas which is partially concentrated. Therefore, more liquid flows downward in other zones and light particles are suspended more effectively. Heavy particles are more effectively suspended in the zones above the concentrated setup of gas distributors.

Figure 3:
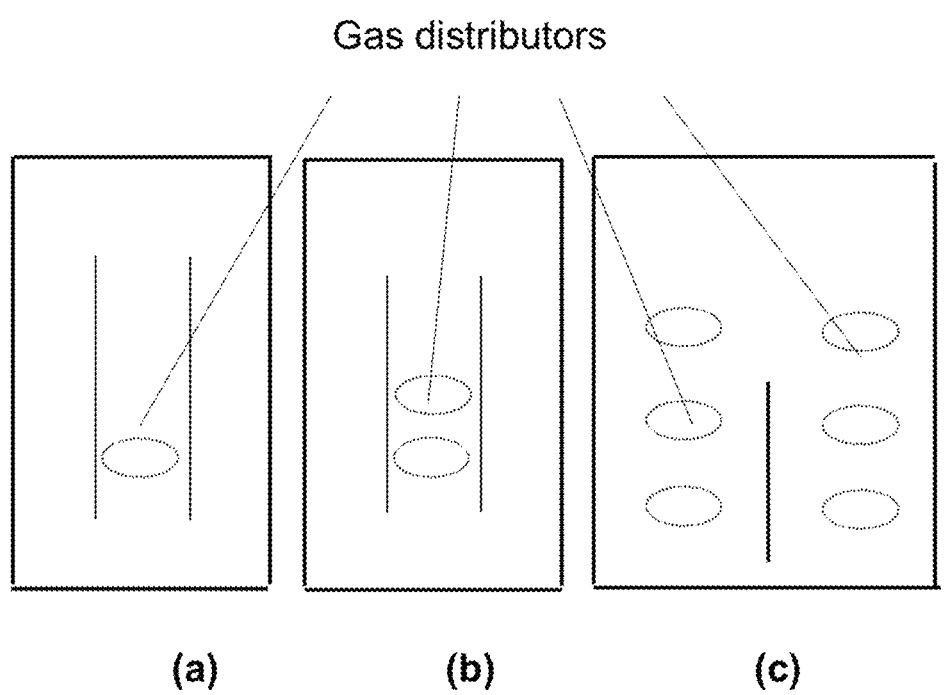
FIG. 3 is the schematic diagram of the types of one or multiple gas distributors along the vertical direction in the gas-liquid-solid three-phase region.

In another embodiment, the gas distributors set up in the three-phase region can be in one or more locations in the same cross section, forming vertical or nearly vertical arrangements of two or more distributors along the system height. The concrete forms are shown in FIG. 3. FIGS. 3(a) and 3(b) are gas distributors with tubes, where gas distributors are arranged in the system along the vertical direction of tubes but not limited inside the tubes. FIG. 3(c) demonstrates the vertical arrangement of gas distributors along the system height in various cross-sectional locations in the absence of tubes. FIG. 3(c) refers to the staged arrangement of gas distributors, suitable for larger equipment with low efficiency or high efficiency. So-called staged arrangement starts from the bottom of the equipment and moves up at a certain distance. Moreover, the method of gas intake can be continuous or intermittent, but the intermittent type can save some energy. The way that gas distributors vertically arranged along the system height leads to the gas to go through the zones upward in precedence. This arrangement prompts the formation of locally concentrated rising of the gas, causing more liquid flows downward in other zones so as to suspend particles more effectively. Furthermore, the gas distributors may be low-efficiency gas distributors or high-efficiency gas distributors. High-efficiency ones are preferable in aerobic environments, such as a microporous gas distributor. As a result, bubbles can be more uniformly distributed in the reaction zone to improve particle suspension and increase the amount of dissolved oxygen. In contrast, in anoxic or anaerobic environments, low-efficiency ones are preferred, such as tube distributors. They are able to induce the generation of large bubbles, thereby enhancing the self-circulation of the liquid and reducing the amount of dissolved oxygen.

In another embodiment, in the light particle system for wastewater treatment, the shape of the contactor is a regular shell or an irregular shell. Preferably, the regular shell is a rectangular shell and the upper surface of the rectangular shell is fully closed, partially closed or fully opened. It is easy to understand that a proper shape can be freely selected for such a contactor depending on specific application scenarios.

Moreover, in the light particle system for wastewater treatment, the contactor is installed with microchannels. The microchannels contain several layers of packing, every layer of the packing contains some unit channels, and the unit channels in each layer are interlaced. Preferably, the microchannels are located near the bottom of the contactor. These microchannels allow the fluid to be uniformly distributed before entering the gas-liquid-solid three-phase system, which facilitates subsequent contact and mass transfer between phases.

Furthermore, the unit channels are cubic channels, rectangular channels or other types of channels. This embodiment discloses the particular selection of unit channels. In principle, regular-shaped channels, such as cubic or rectangular shapes, can be a preferable choice, beneficial for reducing unnecessary energy consumption during distribution.

Besides, in another embodiment, the present disclosure discloses a process for wastewater treatment using the light particle system or mixed particle system. Wastewater is fed into the light particle system or mixed particle system and treated wastewater is discharged from the light particle system or mixed particle system. Relying on this process, water circulation system can process wastewater continuously.

In another embodiment, the process of wastewater treatment using light particles or mixed particles can be detailed as follows: the wastewater system is equipped with a light particle system or a mixed particle system with a certain volume, as described above, and carrying microorganisms. Wastewater flows into the system from the top or bottom of the system intermittently or continuously. Gas is fed from the bottom of the apparatus and enters the system through the aeration device. As the gas velocity increases, the average density of the gas-liquid mixed fluid decreases.

When the average density of the gas-liquid mixed fluid is reduced to close or equal to the density of liquid water (or the density of wastewater in specific cases), slight disturbance by the gas or liquid is capable of fluidizing the light particles at the top downward and the heavy particles at the bottom upward. Further increasing the gas velocity to an appropriate value, particles would be uniformly or nearly uniformly dispersed in the system by the gas and liquid. During this process, microorganisms adhered on the solids treat the wastewater and the treated water is discharged from the system. Preferably, in order to increase the hydraulic retention time, a device for water self-circulating may be employed in the system additionally.

Furthermore, multiple light particle or mixed particle systems are applied wherein any of the light particle or mixed particle systems are connected with at least one of other light particle or mixed particle systems by liquid circulating pipes. In this embodiment, a plurality of the light particle or mixed particle systems are used together to enhance the ability of wastewater treatment. In addition, when multiple light particle or mixed particle systems are used together, the environment of the contactor may be anaerobic, anaerobic, aerobic or their combination.

In another embodiment, in the light particle or mixed particle system, the light particles or mixed particles are added or discharged continuously or intermittently. For this embodiment, the light particles or mixed particles are added into the system continuously or intermittently and taken out of the light particle or mixed particle system continuously or intermittently, making it easy for particle circulation. If the light particles or mixed particles are continuously added to the system and continuously withdrawn from the system, it benefits the recycling of the solid particles and facilitates as needed. If the light particles or mixed particles are intermittently added to the system and intermittently removed from the system, it can be used for particle refreshment as needed.

Moreover, in another embodiment, in the light particle or mixed particle system, the liquid phase is added or discharged continuously or intermittently. Optionally, the liquid phase is fed from the top of the gas-liquid-solid three-phase region.

In addition, when the environment of the contactor is anaerobic or anoxic, the gas phase is aerated intermittently. When the environment of the contactor is aerobic, the gas phase is aerated intermittently or continuously. Based on oxygen demand of the biological environment, different aeration methods can effectively control the oxygen content in the system to provide the best environment for the growth of microorganisms.

Figure 4:
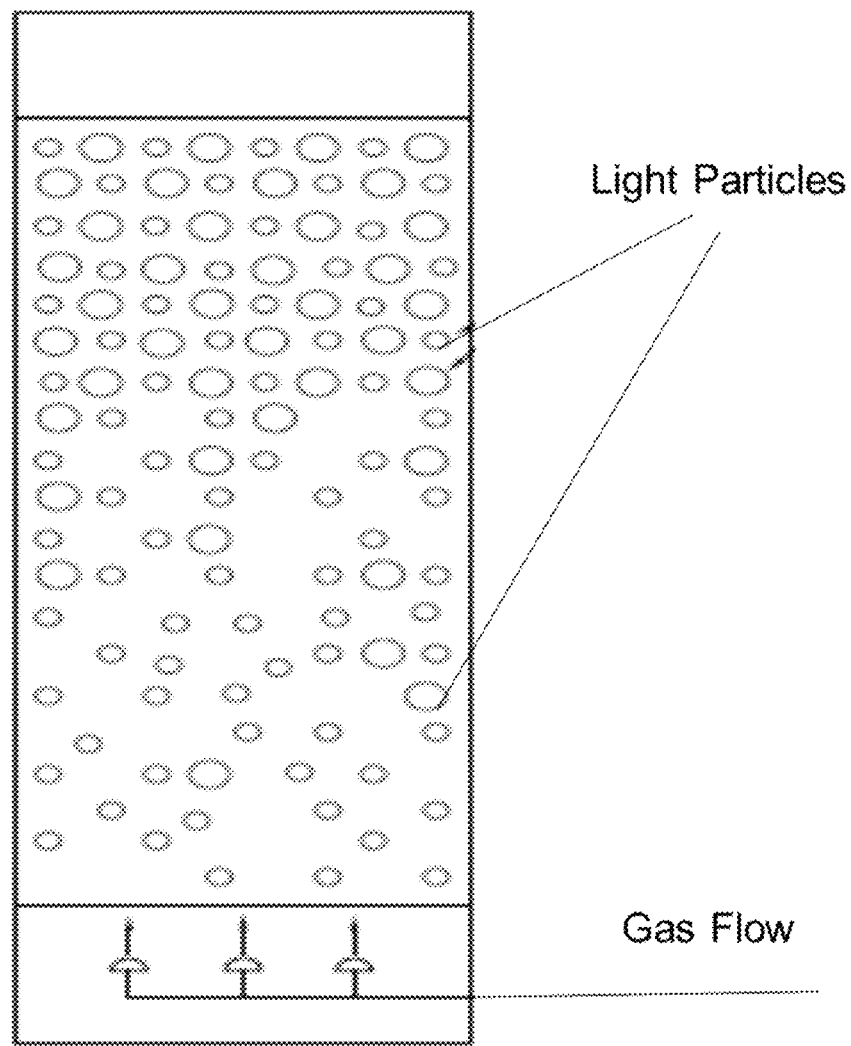
FIG. 4 is the schematic diagram of the light particle suspension system in the present disclosure.

In another embodiment shown in FIG. 4, the light particle suspension system in the present disclosure contains a bed with a diameter of 15.24 cm and a height of 3.6 m (other dimensions are acceptable: such as the bed height being 4 m and the diameter being 33 cm; the bed height being 8 m and the diameter being 150 cm). In this light particle suspension system, water is selected as the continuous liquid phase, air is the gas phase, and ellipsoidal polyethylene particles with a density of 910 $kg/m^3$ and a diameter of 3.5 mm act as the solid phase (can also be light particles with a diameter smaller than 5 mm and a density between 800 and 1000 $kg/m^3$). Water can be added into the system continuously or intermittently from the top of the apparatus. Air enters the three-phase system after being injected from the bottom of the apparatus and uniformly distributed by gas distributors. Moreover, gas distributors are evenly arranged in the cross section of the system. There are various types of gas distributors, such as perforated plates, microporous plates, bubble caps, multitubes, membranes, packings, etc. The preferred choice is distributors releasing gas evenly and generating bubbles with a small diameter. The gas distributors in the present disclosure adopt rubber microporous aerators.

Alternatively, after adding liquid water from the top of the apparatus until the liquid level reaches 2.5 m and loading solid particles at a volume fraction being 5%-30% of the liquid, solid light particles will float at the top of the liquid surface due to buoyancy. When the gas is injected into the system and as the gas velocity increases, particles at the lower layers start to expand downwards to achieve fluidization. The height of the layer of particles at the top reduces gradually and when the gas velocity reaches the minimum fluidization velocity, the layer of particles at the top no longer exists on the liquid surface. All the particles are suspended in the liquid water by the gas and the density distribution of particles decreases from top to bottom along the vertical direction of the system. Further increasing gas velocity causes more particles to move downward and the density distribution gradient of particles in the vertical direction become more constantly distributed. When the gas velocity increases to a certain value, the density distribution of particles in the vertical direction of the system becomes uniform.

Under different solids loading heights, the minimum fluidization velocities are different. For example, with a diameter of 3.5 mm and a density of 910 $kg/m^3$, the minimum fluidization velocity increases 0.6 cm/s to 2.0 cm/s with increasing ratio of solids loading height to initial bed height from 5% to 30%. If the continuous liquid phase is added into the light particle system, the downward movement of particles is further enhanced. As the liquid velocity increases, the minimum fluidization velocity decreases. The continuous addition and discharging of the liquid can assist the gas to disperse light particles in the system, making them easier to be suspended in the liquid.

Applications of the Present Systems

The application of the present systems will be further described below in relation to wastewater treatment, but it may also be used in other applications, for example, effluent treatment from a host of industrial processes. In addition, the system of the present disclosure can also be used for other chemical or biochemical reaction processed where solid particles are in contact with gas and liquid phases.

The present disclosure will now be illustrated using the following non-limiting examples.

Examples

In another embodiment as shown in FIG. 4, the light particle suspension system in the present disclosure includes the gas-liquid-solid three-phase region. The gas-liquid-solid three-phase region includes the gas phase, liquid phase, and solid phase. The liquid phase is wastewater to be treated and the gas phase is air. Air not only offers sufficient oxygen to the system but also provide the power to fully mix particles.

Figure 5:
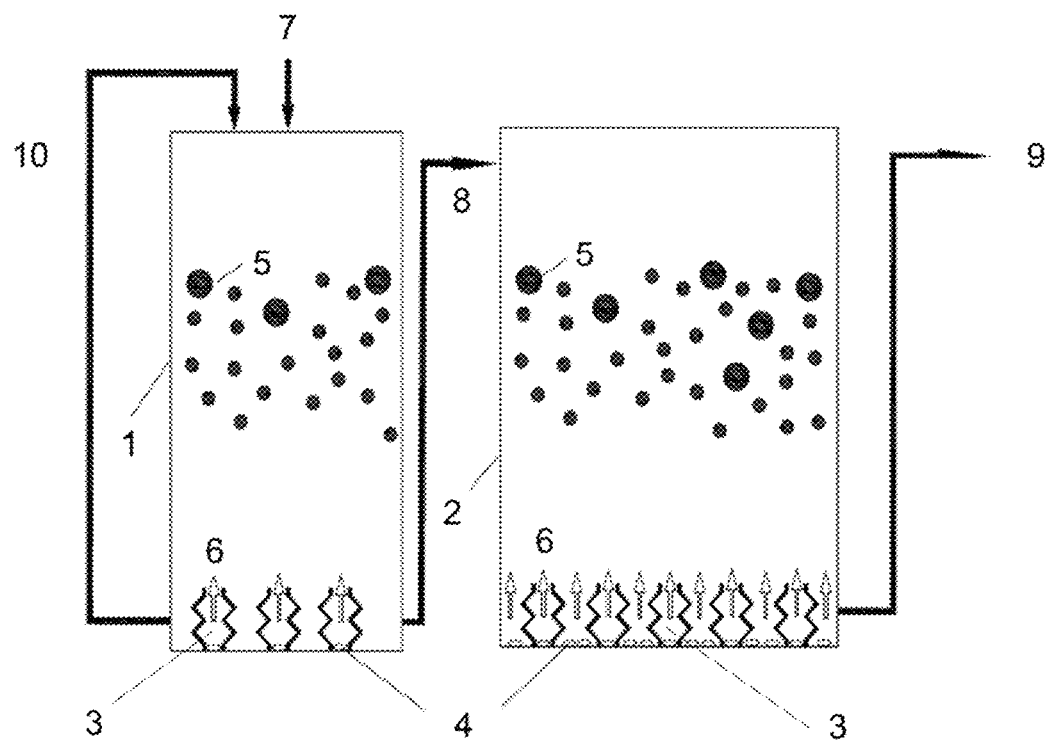
FIGS. 5 to 7 are the schematic diagrams of the light particle wastewater treatment system in the present disclosure.

FIG. 5 presents the schematic diagram of the light particle wastewater treatment system in the present disclosure and this apparatus consists of two contactors. Contactor 1 and contactor 2 are biological reaction zones. Contactor 1 is the anoxic zone with its size being 0.5 m×1 m×6 m (length×width×height), while contactor 2 is the aerobic zone with its size being 1 m×1 m×6 m (length×width×height). 3 represents high-efficiency packing. Both contactor 1 and contactor 2 are equipped with high-efficiency packing layers placed near the bottom of the contactors. This setup provides more attachment sites for microorganisms and contributes to more uniform gas distribution. Aeration tubes 4 are arranged near the bottom of the contactors, adopting a uniform arrangement on the cross section of the system. The amount of aeration in the anoxic zone is smaller than that in the aerobic zone and the number of aeration tubes 4 in contactor 2 is larger than that in contactor 1. The gas used is air 6 and aeration tubes are microporous rubber tubes with a diameter of 10 cm. Contactor 1 and contactor 2 are both loaded with light particles 5, which have a density of 930 kg/m$^3$ and an equivalent diameter of 2.5 mm (can also be light particles with a diameter smaller than 5 mm and a density between 800 kg/m$^3$ and 1000 kg/m$^3$). It will be appreciated by those skilled in the art that the dimensions for the contactors 1 and 2 disclosed herein are exemplary only and may be scaled up or down depending on the application at hand.

Wastewater 7 enters contactor 1, which has a small amount of aeration, and triggers anoxia reactions such as denitrification. To achieve better fluidization of light particles in contactor 1, internal circulation is added to contactor 1, i.e., a portion of the water is taken from the bottom of the contactor 1 to the top through pipe 10, improving wastewater treatment in the anoxic zone. The wastewater treated by contactor 1 flows into contactor 2 through pipe 8 and aerobic reactions occur in contactor 2 due to a large amount of aeration. The wastewater passing through contactor 2 reaches corresponding emission standards and can be discharged through pipe 9.

Wastewater treatment experiments using this apparatus possessed a daily capacity of 70 tons. During the operation period, the average COD of the inflow was 250 g/m$^3$, the average NH$_4$—N was 30 g/m$^3$, the total nitrogen was 36 g/m$^3$, and the total phosphorus was 1.8 g/m$^3$. After 2.0 hours of hydraulic retention time, 90% of COD, 96% of total nitrogen, and 85% of total phosphorus were removed. The effluent met the water standards of "Surface Water Environmental Quality Standards" (GB3838-2002) Class IV in China.

Figure 6:
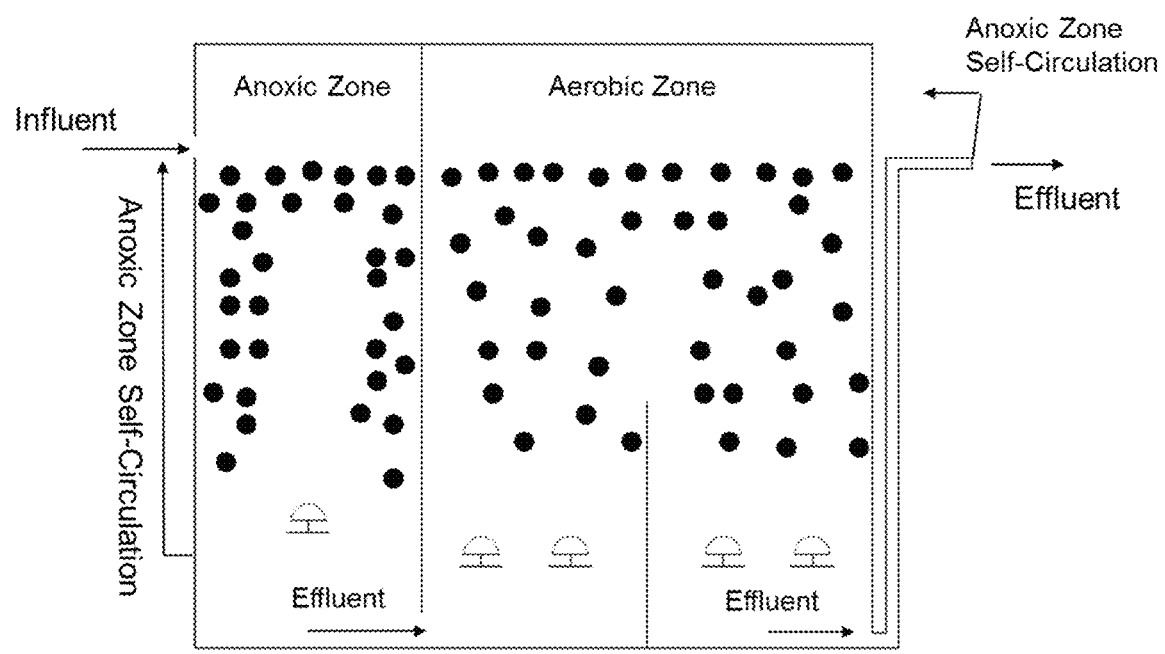

In another embodiment, FIG. 6 shows the schematic diagram of the light particle wastewater treatment system in the present disclosure and this apparatus consists of two biological reaction zones. The two biological reaction zones are an anoxic zone and an aerobic zone. The entire apparatus is made of carbon steel plates. The effective size of the anoxic zone is 1 m×1 m×5 m (length×width×height) and the effective size of the aerobic zone is 2 m×1 m×5 m. The thickness of the baffle between the anoxic zone and the aerobic zone is 10 mm, while the baffle inside the aerobic zone has a thickness of 5 mm and a height of 1.2 m. Both the anoxic zone and the aerobic zone are loaded with light particles having a density of 950 kg/m$^3$, an equivalent diameter of 3.0 mm, and outer surfaces able to carry microorganisms.

In the anoxic zone, gas distributors are concentrated near the bottom of the apparatus (may also be located at other heights). The preferred choice of gas distributors is low-efficiency distributors, such as tube distributors. The aim is to induce the generation of large bubbles and the formation of locally concentrated gas. Thus, it drives the nearby liquid to move upward and cause more liquid to flow downward in the other zones, thereby light particles are suspended more effectively. Also, the high rising velocity of large bubbles and low mass transfer rate can reduce the amount of dissolved oxygen, which is suitable for anoxic zones.

In the aerobic zone, multiple gas distributors are evenly located on the cross section of the system on both sides of the baffle. Gas distributors are microporous rubber tubes with a diameter of 10 cm. This type of microporous rubber tubes produces small bubbles through aeration and the high aeration efficiency increases the amount of dissolved oxygen in the system, which is beneficial for the growth and reproduction of microorganisms. Also, increasing the amount of gas leads to decreasing average density of the gas-liquid mixture in the system and the disturbance of particles due to the effect of gas on the liquid is more conducive to the suspension of light particles.

Wastewater enters the anoxic zone from the top and anoxic reactions, such as denitrification, occur due to the low aeration rate. In order to improve the fluidization of light particles in the anoxic zone, self-circulation of water can be set up in the anoxic zone to enhance wastewater treatment in the anoxic zone. The wastewater treated in the anoxic zone flows into the aerobic zone on the right through the channel connected near the bottom. Aerobic reactions take place in the aerobic zone with high aeration rate. Similar to the anoxic zone, self-circulation of water may be adopted in the aerobic zone for better fluidization of light particles. After treatment in the aerobic zone, wastewater can be discharged from the bottom of the apparatus through the rising pipeline when the corresponding emission standards are met.

Wastewater treatment experiments using this apparatus possessed a daily capacity of 150 tons. During the operation period, the average COD of the inflow was 260 g/m$^3$, the average NH$_4$—N was 30 g/m$^3$, the total nitrogen was 38 g/m$^3$, and the total phosphorus was 1.7 g/m$^3$. After 2.0 hours of hydraulic retention time, 91% of COD, 95% of total nitrogen, and 85% of total phosphorus were removed. The effluent met the water standards of "Surface Water Environmental Quality Standards" (GB3838-2002) Class IV.

Figure 7:
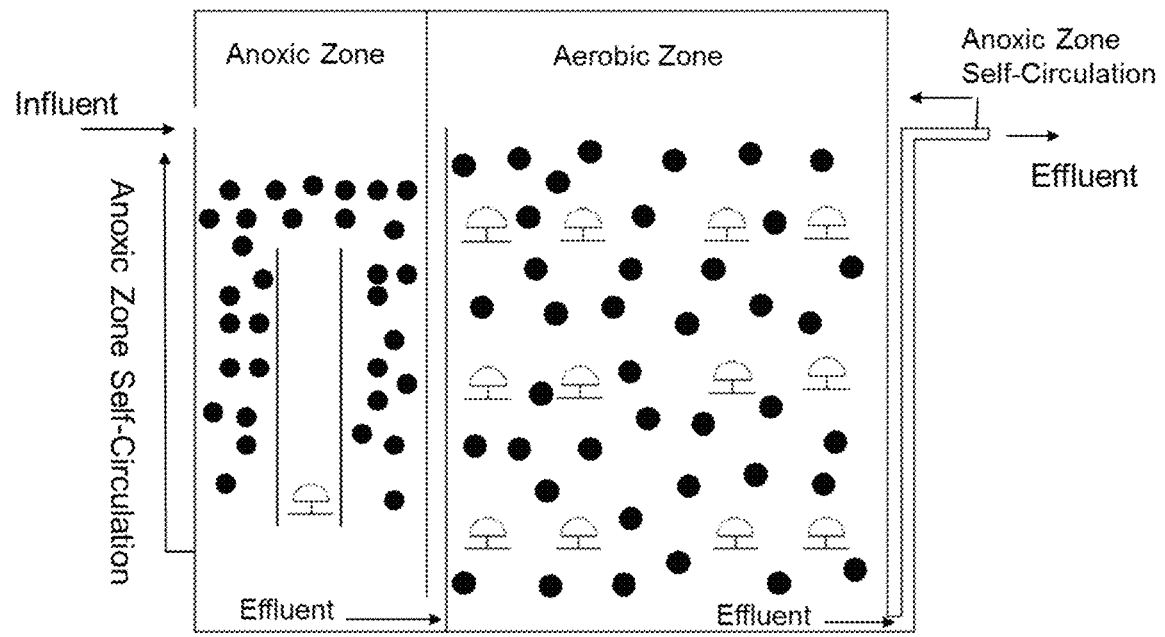

In another embodiment, FIG. 7 shows the schematic diagram of the light particle wastewater treatment system in the present disclosure and this apparatus consists of two biological reaction zones. The two biological reaction zones are an anoxic zone and an aerobic zone. The entire apparatus is made of carbon steel plates. The effective size of the anoxic zone is 1 m×1 m×8 m (length×width×height) and the effective size of the aerobic zone is 1 m×2 m×8 m. Both the anoxic zone and the aerobic zone are loaded with light particles having a density of 960 kg/m$^3$, an equivalent diameter of 3.0 mm, and outer surfaces able to carry microorganisms.

In the anoxic zone, gas distributors are installed inside the internal tube (may also be an external tube). The preferred choice of gas distributors is low-efficiency distributors, such as perforated plate distributors. Gas forms large rising bubbles in the liquid and such bubbles drive liquid in the tube to flow upward to the top of the system during the rising process along the tube. Thus, it causes the liquid at the top of the system to flow downward around the tube, thereby light particles are suspended more effectively. Also, the high rising velocity of large bubbles and low mass transfer rate can reduce the amount of dissolved oxygen, which is suitable for anoxic zones.

In the aerobic zone, gas distributors are installed at several different locations on the cross section, forming vertical arrangements of multiple distributors along the system height. The gas distributors are microporous aeration heads. This type of microporous aeration head produces small bubbles through aeration and the high aeration efficiency increases the amount of dissolved oxygen in the system, which is beneficial for the growth and reproduction of microorganisms. Also, increasing the amount of gas leads to decreasing average density of the gas-liquid mixed fluid in the system. The disturbance of particles due to the effect of gas on liquid is more conducive to the suspension of light particles.

Wastewater enters the anoxic zone from the top and anoxic reactions, such as denitrification, occur due to the low aeration rate. In order to improve the fluidization of light particles, self-circulation of water can be set up in the anoxic zone to enhance wastewater treatment. The wastewater treated in the anoxic zone flows into the aerobic zone on the right through the channel connected near the bottom. Aerobic reactions take place in the aerobic zone with a high aeration rate. Similar to the anoxic zone, self-circulation of water may be adopted in the aerobic zone for better fluidization of light particles. After treatment in the aerobic zone, wastewater can be discharged from the bottom of the apparatus through the rising pipeline when the corresponding emission standards are met.

Wastewater treatment experiments using this apparatus possessed a daily capacity of 200 tons. During the operation period, the average COD of the inflow was 255 $g/m^3$, the average $NH_4$—N was 32 $g/m^3$, the total nitrogen was 39 $g/m^3$, and the total phosphorus was 1.8 $g/m^3$. After 2.0 hours of hydraulic retention time, 90% of COD, 93% of total nitrogen, and 84% of total phosphorus were removed. The effluent met the water standards of "Surface Water Environmental Quality Standards" (GB3838-2002) Class IV in China.

Figure 8:
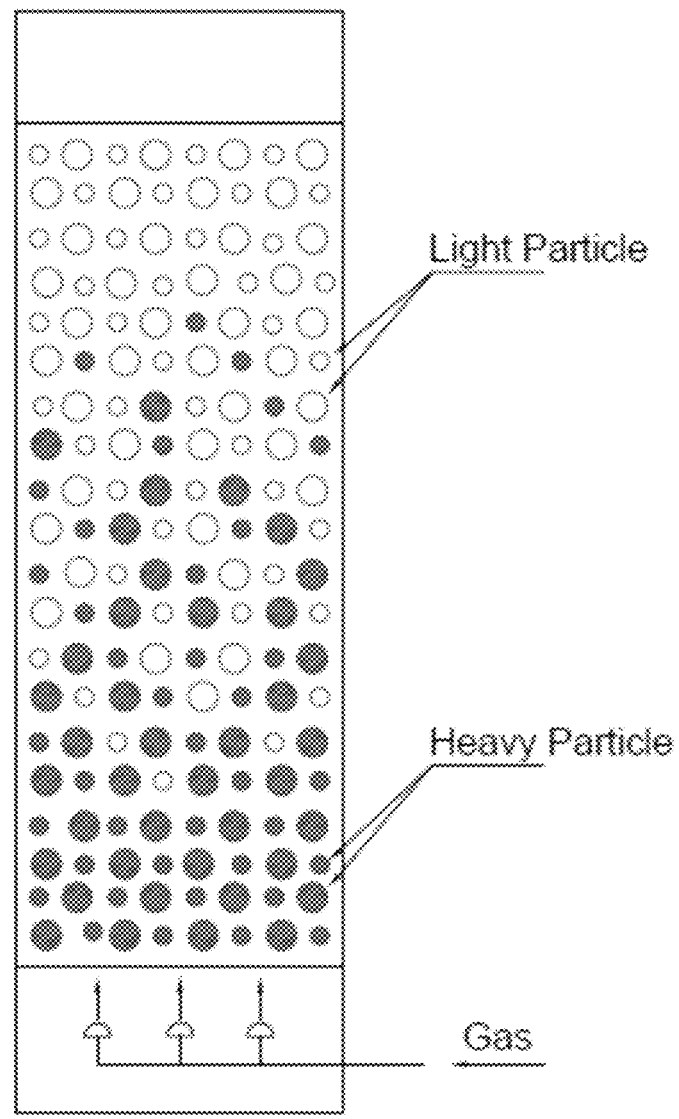
FIG. 8 is the schematic diagram of the mixed particle suspension system.

In another embodiment, FIG. 8 shows a mixed particle suspension system in the present disclosure. The mixed particle suspension system includes the gas-liquid-solid three-phase region. The gas-liquid-solid three-phase region includes the gas phase, liquid phase and solid phase. The liquid phase is wastewater to be treated and the gas phase is air. Air not only offers sufficient oxygen to the system, but also provides the power to mix the particles. Mixed particles, containing light particles and heavy particles, are selected as the solid phase. Microorganisms attached to the surfaces of mixed particles are used to treat wastewater.

The bed has a height of 6 m and a diameter of 0.5 m (other dimensions are acceptable, such as a height of 4 m and a diameter of 0.3 m, a height of 8 m and a diameter of 1.6 m, etc.). This mixed particle suspension system includes the gas phase, liquid phase and solid phase. Air is selected as the gas phase, water is the liquid phase and mixed particles are the solid phase. Mixed particles consist of light particles and heavy particles. Light particles are spherical polypropylene particles with a density of 910 $kg/m^3$ and diameters of 3.5 mm and 2.28 mm (can also be light particles with a diameter smaller than 5 mm and a density between 800 and 1000 $kg/m^3$). Heavy particles are spherical polystyrene particles with a density of 1030 $kg/m^3$ and diameters of 1 mm and 0.8 mm (can also be heavy particles with a diameter smaller than 5 mm and a density between 1000 and 1200 $kg/m^3$).

Water as the liquid phase may be selectively fed into the mixed particle system from the top or bottom of the apparatus intermittently or continuously. Air is injected into the system from the bottom of the apparatus through gas distributors and gas distributors are chosen to be rubber microporous aeration heads. Alternatively, after adding liquid water until the liquid level reaches 4 m and loading heavy particles at a volume fraction of 10%, heavy particles will settle at the bottom of the apparatus due to gravity. Then, after loading light particles at a volume fraction of 10%, light particles will float at the top of the liquid surface. At this time, the gas is introduced into the system. As the gas velocity increases, heavy particles located at the bottom of the liquid start to expand upward due to the drag force of the gas. Light particles at the top of the liquid surface begin to expand downward under the effect of decreasing density of the gas-liquid mixture and the disturbance of gas to liquid. When a certain gas velocity is reached, the mixed particles obtain uniform or near uniform distribution in the vertical direction, which makes full use of the space to achieve the maximum mass transfer rate.

FIG. 9 presents the apparatus of the mixed particle system for wastewater treatment and this apparatus consists of two contactors. Particles in contactor 1 are the mixture of light and heavy particles while particles in contactor 1 are light particles. Contactor 1 and contactor 2 are biological reaction zones. Contactor 1 is the anoxic zone with its size being 1 m×1 m×6 m (length×width×height) (can also be other size combination, such as 0.6 m×0.8 m×5 m and 1 m×2.8 m×8 m). Contactor 2 is the aerobic zone with its size being 2 m×1 m×6 m (length×width×height) (can also be other size combination, such as 1.2 m×0.8 m×5 m and 2 m×2.8 m×8 m). Aeration tubes 3 are arranged near the bottom of contactors. The amount of aeration in the anoxic zone is smaller than that in the aerobic zone and the number of aeration tubes in contactor 2 is larger than that in contactor 1. Air 6 is used as the gas and aeration tubes are microporous rubber tubes with a diameter of 10 cm. Contactor 1 are loaded with the mixture of light and heavy particles. Light particles 5 have a density of 910 $kg/m^3$ and an equivalent diameter of 2.5 mm. Heavy particles 4 have a density of 1200 $kg/m^3$ and an equivalent diameter of 1.8 mm (can also be heavy particles with a diameter smaller than 5 mm and a density between 1000 $kg/m^3$ and 1200 $kg/m^3$). Contactor 2 are loaded with light particles, which have a density of 910 $kg/m^3$ and an equivalent diameter of 2.5 mm (can also be light particles with a diameter smaller than 5 mm and a density between 800 $kg/m^3$ and 1000 $kg/m^3$).

Wastewater 7 enters the biological reaction zone from the bottom of contactor 1. Contactor 1 is the anoxic zone which has a small amount of aeration and mainly triggers anoxia reactions such as denitrification. Heavy particles move upward with the effect of liquid and gas while light particles move downward with the effect of gas. To improve wastewater treatment in the anoxic zone, internal circulation is designed in contactor 1, i.e., a portion of the water returns to the bottom of the contactor from the top of the contactor through pipe 10. The wastewater treated by contactor 1 flows into contactor 2 through pipe 8 and aerobic reactions occur in the contactor 2 due to the large amount of aeration. The wastewater passing through contactor 2 reaches corresponding emission standards and can be discharged through pipe 9. If the wastewater does not meet the standards, it would be returned to contactor 1 through pipe 11 and treated again.

Wastewater treatment experiments using this apparatus possessed a daily capacity of 120 tons. During the operation period, the average COD of the inflow was 208 g/m$^3$, the biodegradable portion is 110 g/m$^3$, the average $NH_4$—N was 30 g/m$^3$, the total nitrogen was 32 g/m$^3$, and the total phosphorus was 2 g/m$^3$. After 2.0 hours of hydraulic retention time, 86% of COD, 98% of total nitrogen, and 85% of total phosphorus were removed. The effluent met the water standards of "Surface Water Environmental Quality Standards" (GB3838-2002) Class IV in China.

In an embodiment, the present disclosure provides a light particle wastewater treatment apparatus containing two or more biological reaction zones. The biological reaction zones, which are light particle or mixed particle systems, can be a combination of two or multiple of the anaerobic zone, anoxic zone and aerobic zone. The light particle or mixed particle system includes particles acting as the carrier of microbiota and the principle is to benefit the growth of microbiota. The operation mode is free suspension or gas-aid suspension and the liquid in two or more of the biological reaction zones is mutually connected. Heavy particles are added in the wastewater treatment apparatus with light particle systems to form mixed particle systems.

The density of the light particles is lower than the density of the liquid and the size of the particles is changeable. The material and shape of particles are various, such as hollow spherical polypropylene particles, not excluding other particles. The preferable choices are particles with large specific surface areas, a shape closer to spherical and a density close to the liquid. When applied to wastewater treatment, particles with a surface suitable for the growth of microorganisms are preferred. The light particle system includes two operation modes, free suspension and gas-aided suspension.

The operation mode of free suspension is as follows: at the initial state, light particles float near the top of the liquid because the density of light particles is lower than the liquid density. In this case, particles only contact with the liquid near the top. When the gas is injected from the bottom, gas bubbles enter the liquid to form a gas-liquid mixture. Light particles near the top of the liquid move downward and are eventually suspended in the gas-liquid mixture by adjusting the gas inlet. In the gas-aid suspension mode, the wastewater treatment apparatus in this disclosure includes a gas-driven liquid self-circulation device, which can be placed outside the apparatus when the apparatus is relatively small.

As shown in FIG. 10(a), gas injected into the circulating tube forms large rising bubbles in the liquid to drive the liquid in the circulating tube to flow upward and enter the top of the apparatus. Meanwhile, the liquid inside the apparatus flow downward so that light particles move downward along with the liquid and are eventually suspended in the liquid.

When the apparatus is relatively large, the gas-driven liquid self-circulation device can be installed inside the apparatus. As shown in FIG. 10(b), (c), and (d), at the initial state, light particles float near the top of the liquid because the density of light particles is lower than the liquid density. In this case, particles only contact with the liquid near the top. When the gas is injected from the bottom, large bubbles formed by gas released from gas distributors drive the above liquid flow upward. In contrast, the liquid in the bubble-free region flows downward so that light particles move downward along with the liquid and are eventually suspended in the liquid.

The gas-driven liquid self-circulation device can include gas distributors and tubes, as shown in FIGS. 10(a) to 10(d). When the gas-driven liquid self-circulation device is installed outside the apparatus, as shown in FIG. 10(a), gas distributors and tubes present at the same time. When the gas-driven liquid self-circulation device is installed inside the apparatus, as shown in FIGS. 10(b), 10(c), and 10(d), tubes are not necessary but preferred. The tubes can be fully-closed (FIG. 10(b)), semi-porous (FIG. 10(c)) or fully-porous (FIG. 10(d)). The porous or semi-porous wall of those guiding tubes allow free exchange of liquid while limiting the flow of bubbles. The gas distributors can be low-efficiency or high-efficiency. High-efficiency gas distributors are preferable in the free suspension mode, such as microporous gas distributors, because they distribute bubbles uniformly in the reaction zones, improve the suspension of particles and increase the dissolved oxygen. In contrast, low-efficiency gas distributors are preferred in the gas-aid suspension mode, such as tube distributors, which can induce the generation of large bubbles to increase liquid self-circulation rate and decrease the dissolved oxygen.

The arrangement of gas distributors in the apparatus are various, as shown in FIGS. 2 and 3, wherein FIG. 2 (a) and (b) are suitable for the free suspension mode. FIG. 2 (a) represents the uniform arrangement of gas distributors on both sides of the baffle and FIG. 2 (b) represents the arrangement without the baffle.

Moreover, FIG. 2 (c) and (d) are suitable for gas-aid suspension mode. FIG. 2 (c) is the arrangement with tubes and FIG. 2 (d) is the arrangement without tubes. In addition, FIG. 3 (a) and (b) indicate that the arrangement of gas distributors can be at various heights and not limited inside the tubes. FIG. 3 (c) shows the staged arrangement of low-efficiency or high-efficiency gas distributors, suitable for relatively large apparatus. The staged arrangement starts from the bottom of the apparatus and moves upward at certain distances. The gas intake can be continuous or intermittent, but the intermittent method saves some energy.

As stated above, the biological reaction zones include a combination of two or multiple of the anaerobic zone, anoxic zone and aerobic zone, which allows the treatment of different pollutants in different environments. If aerobic, anaerobic and anoxic environments can be combined, the wastewater treatment apparatus in the present disclosure is able to be applied in a variety of wastewater treatment processes.

The apparatus applied in wastewater treatment follows this procedure: wastewater flows into the biological reaction zones via the inflow system to receive biological treatment. The treated wastewater goes through sedimentation and the effluent meeting the standards is eventually obtained. Usually, sedimentation takes place in a separate settling tank set up outside the apparatus. Alternatively, the particle-free zone (such as the bottom) in the biological reaction zones of the apparatus can be the settling zone, in which sedimentation can significantly reduce the sludge content in the effluent. As shown in FIG. 11, the region below the dotted line is the settling zone (particle-free zone). In order to further remove the three kinds of nitrogen (nitrite nitrogen, nitrate nitrogen, and ammonia nitrogen), some of the treated wastewater may be recycled to one or more biological reaction zones for re-treatment.

The apparatus consists of an inflow system and an effluent system. The inflow system may contain inflow pumps, inflow tubes, etc. The effluent system has effluent tubes and π-shaped tubes are preferred to maintain a certain liquid level in the apparatus.

In another embodiment, FIG. 12 shows the wastewater treatment apparatus with light particle systems according to the present disclosure. The apparatus includes an anoxic zone and an aerobic zone and both of them are light particle systems. Also, the anoxic zone and the aerobic zone are partially connected, the treated liquid in the aerobic zone is recycled back to the anoxic zone and no settling zone exists. In FIG. 12, the operation mode in the anoxic zone is gas-aid suspension. The gas-driven liquid self-circulation device only contains gas distributors while tubes are absent inside the apparatus. Moreover, the treated effluent enters the aerobic zone from the bottom. To ensure the effluent flows through the aerobic reaction zone, a baffle is added in the aerobic zone to prevent treated effluent in the anoxic zone from directly flowing out of the exit at the bottom of the aerobic zone. The operation mode adopted in the aerobic zone is free suspension. FIG. 13 shows another means of enforcement, which differs from FIG. 12 as follows: the gas-driven liquid self-circulation device in the anoxic zone contains gas distributors and tubes. The tubes are fully-closed and gas distributors are inside the tubes. The treated effluent enters the aerobic zone from the top and no baffle is installed in the aerobic zone. Some of the effluent from the aerobic zoon is recycled back to the anoxic zone after mixed with the fresh wastewater.

In this embodiment, the entire apparatus is made of carbon steel plates with the effective length being 3 m×1 m×6 m. The effective size of the aerobic zone is 2 m×1 m×6 m and the effective size of the anoxic zone is 1 m×1 m×6 m. The thickness of the baffle between the anoxic zone and the aerobic zone is 1 cm while the baffle inside the aerobic zone has a thickness of 0.5 cm and a height of 1.6 m. The selected particles are polypropylene ellipsoidal light particles with a density of 930 kg/m$^3$ and an equivalent diameter of 2.5 cm. Furthermore, air acts as the gas. For the free suspension mode, gas distributors are microporous rubber tubes with a diameter of 10 cm and a ventilatory capacity of 5 m$^3$/(m·h) and multiple rubber tubes are used to ensure the suspension of particles. For the gas-aid suspension mode, gas distributors are non-porous tubes with a diameter of 3.5 cm and require the arrangement of multiple non-porous tubes. The effluent treated in the aerobic zone is recycled back (as shown in FIG. 13) to the anoxic zone and the circulation rate is four times the inflow rate.

The culture method of microorganism in this apparatus is as follows: the fresh activated sludge is collected from septic tanks or other places and fed into this apparatus. Wastewater is pumped into the apparatus and microorganisms are cultivated using internal wastewater circulation. As a result, the adaptability of microorganisms to such wastewater is improved and better treatment results are obtained.

The online monitoring system is adopted in this apparatus. Apart from monitoring the flowrates of inflows and effluents in each section, the dissolved oxygen in the water (e.g. by dissolved oxygen probes) and pH are monitored as well. The feedback control of the monitoring system is able to adjust the environments in biological reaction zones to meet the needs of microorganisms. For instance, by monitoring the dissolved oxygen in water using dissolved oxygen probes, the dissolved oxygen can be controlled to create anaerobic, anoxic and aerobic environments.

The process of the entire apparatus is shown in FIG. 12. Wastewater enters the anoxic zone via the inflow system. The treated wastewater in the anoxic zone enters the aerobic zone from the bottom. It can continue to other biological reaction zones if necessary or leaves the apparatus from the bottom of the aerobic zone. Some of the wastewater becomes the effluent, while the other is recycled back to the anoxic zone after mixed with the fresh wastewater (as shown in FIG. 13). In addition, gas is introduced into each reaction zone through gas distributors.

Wastewater treatment experiments using this apparatus possessed a daily capacity of 160 tons. During the operation period, the average COD of the inflow was 278 g/m$^3$, the biodegradable portion is 189 g/m$^3$, the average NH$_4$—N was 29.1 g/m$^3$, and the total nitrogen was 31 g/m$^3$. After 2.5 hours of hydraulic retention time, 89% of COD, 97% of NH$_4$—N, and 83% of total nitrogen were removed. The detailed data are shown in Table 1. Since the wastewater did not pass through a settling zone, the TSS and VSS of sludge in the effluent were greater than in the inflow. The effluent met the water standards of "Pollutant Emission Standards of Urban Wastewater Treatment Plants" (GB18918-2002) Class A in China.

TABLE 1

| Parameter | Influent | Effluent |
| --- | --- | --- |
| pH | 7.1-7.4 | 7.2-7.6 |
| TCOD (mg/L) | 278 ± 31 | 31 ± 16 |
| SCOD (mg/L) | 252 ± 35 | 14 ± 4 |
| SBOD (mg/L) | 189 ± 26 | 9 ± 5 |
| NH$_4$—N (mg/L) | 29.1 ± 3 | 0.7 ± 0.4 |
| NO$_3$—N (mg/L) | 0.5 ± 0.2 | 2.6 ± 0.5 |
| TN (mg/L) | 31 ± 3.1 | 5.4 ± 1.3 |
| STN (mg/L) | 29.6 ± 3 | 3.9 ± 0.8 |
| TSS (mg L) | 18 ± 6 | 26 ± 14 |
| VSS (mg/L) | 13 ± 5 | 16 ± 10 |

The influent and effluent parameters of the apparatus for treating wastewater

In another embodiment, FIG. 14 shows a means to enforce the wastewater treatment apparatus with light particle systems in the present disclosure. The apparatus includes an anoxic zone and an aerobic zone and both of them are light particle systems. Also, the anoxic zone and the aerobic zone are partially connected. Settling zones are located at the bottom of the anoxic zone and the aerobic zone. In FIG. 14, the operation mode in the anoxic zone is gas-aid suspension. The gas-driven liquid self-circulation device only contains gas distributors while tubes are absent inside the apparatus. Moreover, the treated effluent enters the aerobic zone from the settling zone at the bottom. To ensure the effluent flows through the aerobic reaction zone, a baffle is added in the aerobic zone to prevent treated effluent in the anoxic zone from directly flowing out of the exit at the bottom of the aerobic zone.

The operation mode adopted in the aerobic zone is free suspension and the treated effluent is discharged from the apparatus after sedimentation in the settling zone at the bottom. FIG. 15 shows another means of enforcement, which differs from FIG. 14 as follows: the gas-driven liquid self-circulation device in the anoxic zone contains gas distributors and tubes. The tubes are fully-open and gas distributors are outside the tubes. The treated effluent enters the aerobic zone from the top and no baffle is installed in the aerobic zone. Some of the effluent from the aerobic zoon is recycled back to the anoxic zone after mixed with the fresh wastewater.

In this second embodiment, the entire apparatus is made of carbon steel plates with the effective length being 3 m×1.5 m×6 m. The effective size of the aerobic zone is 2 m×1.5 m×6 m and the effective size of the anoxic zone is 1 m×1.5 m×6 m. The thickness of the baffle between the anoxic zone and the aerobic zone is 1 cm and the baffle inside the aerobic zone has a thickness of 0.5 cm and a height of 2.5 m. The selected particles are polypropylene ellipsoidal light particles with a density of 930 kg/m$^3$ and an equivalent diameter of 2.5 cm. Air acts as the gas. For the free suspension mode, gas distributors are microporous rubber tubes with a diameter of 10 cm and a ventilatory capacity of 5 m³/(m·h) and multiple rubber tubes are used to ensure the suspension of particles. For the gas-aid suspension mode, gas distributors are non-porous tubes with a diameter of 3.5 cm and require the arrangement of multiple tubes. The effluent tube is slightly lower than the inflow entrance. Moreover, the effluent treated in the aerobic zone is recycled back (as shown in FIG. 15) to the anoxic zone and the circulation rate is four times the inflow rate.

The method to cultivate microorganisms in this apparatus is described as follows: the fresh activated sludge is taken from septic tanks or other locations and placed into this apparatus. Wastewater is fed to the apparatus and microorganisms are cultivated by the internal circulation of wastewater. By this means, the adaptability of microorganisms to the wastewater is improved so as to obtain a better result of treatment.

The online monitoring system is adopted in this apparatus. Apart from monitoring the flowrates of inflows and effluents in each section, the dissolved oxygen in the water (e.g. by dissolved oxygen probes) and pH are monitored as well. The feedback control of the monitoring system is able to adjust the environments in biological reactions zones to meet the needs of microorganisms. For instance, by monitoring the dissolved oxygen in water using dissolved oxygen probes, the dissolved oxygen can be controlled to create anaerobic, anoxic and aerobic environments.

The process of the entire apparatus is shown in FIG. 14. Wastewater enters the anoxic zone via the inflow system and the treated wastewater in the anoxic zone enters the settling zone at the bottom. After sedimentation, it enters the aerobic zone from the bottom of the settling zone and can continue to other biological reaction zones if necessary. The wastewater leaves the apparatus from the bottom of the aerobic zone. Some of the wastewater becomes the effluent, while the other is recycled back to the anoxic zone (as shown in FIG. 13) after mixed with the fresh wastewater. In addition, gas is introduced into each reaction zone through gas distributors.

Wastewater treatment experiments using this apparatus possessed a daily capacity of 200 tons. During the operation period, the average COD of the inflow was 278 g/m³, the biodegradable portion is 189 g/m³, the average $NH_4$—N was 29.1 g/m³, and the total nitrogen was 31 g/m³. After 2.5 hours of hydraulic retention time, 89% of COD, 98% of $NH_4$—N, and 84% of total nitrogen were removed. The detailed data are shown in Table 2. Since the wastewater passed through the settling zone, the TSS and VSS of sludge in the effluent were smaller than in the inflow. The effluent met the water standards of "Pollutant Emission Standards of Urban Wastewater Treatment Plants" (GB18918-2002) Class A.

TABLE 2

| Parameter | Influent | Effluent |
|---|---|---|
| pH | 7.1-7.4 | 7.1-7.6 |
| TCOD (mg/L) | 278 ± 31 | 30 ± 15 |
| SCOD (mg/L) | 252 ± 35 | 14 ± 5 |
| SBOD (mg/L) | 189 ± 26 | 9 ± 4 |
| $NH_4$—N (mg/L) | 29.1 ± 3 | 0.6 ± 0.5 |
| $NO_3$—N (mg/L) | 0.5 ± 0.2 | 2.3 ± 0.4 |
| TN (mg/L) | 31 ± 3.1 | 5.1 ± 1.1 |
| STN (mg/L) | 29.6 ± 3 | 3.2 ± 0.6 |
| TSS (mg L) | 18 ± 6 | 10 ± 2 |
| VSS (mg/L) | 13 ± 5 | 7 ± 1 |

The influent and effluent parameters of the apparatus for treating wastewater

In summary, the present disclosure provides a light particle or mixed particle system and their apparatuses for wastewater treatment. Applying this system to wastewater treatment can effectively increase the concentration of microorganisms. Its advantages include high treatment efficiency, low energy consumption, low sludge yield, and small organic load.

The foregoing description of the preferred embodiments of the disclosure has been presented to illustrate the principles of the disclosure and not to limit the disclosure to the particular embodiments illustrated. Each embodiment is described in a progressive manner. The same or similar sections of each embodiment can be referred to each other and each embodiment emphasizes on the differences from other embodiments. Any minor modifications made to the above embodiments according to the technical substance of the present disclosure is equivalent to substitution and improvement and shall be included within the scope of the present disclosure as defined by the appended claims.

Therefore, what is claimed is:

1. A method of wastewater treatment using a fluidized bed mixed particle system wastewater treatment apparatus with light particles and heavy particles and containing two or more biological reaction zones;
    said biological reaction zones being fluidized bed mixed particle systems including light particles and heavy particles and being a combination of two or multiple of an anaerobic zone, anoxic zone and aerobic zone said fluidized bed mixed particle systems being fluidized by gas injected through an array of aeration tubes at a bottom of each biological reaction zone;
    said light particles having a density lower than a density of phase wastewater being treated, and said heavy particles having a density greater than a density of said wastewater being treated;
    said fluidized bed mixed particle system including light and heavy particles acting as carriers of microbiota which facilitate the growth of microbiota; and
    wherein the method comprises operating the apparatus in free suspension mode or gas-aided suspension mode and the liquid in two or more of said biological reaction zones being mutually connected.

2. The method according to claim 1, wherein said gas-aided suspension mode is achieved by introducing gas to disturb the liquid such that the light and heavy particles are suspended in the liquid.

3. The method according to claim 1, wherein said aeration tubes are arranged as a uniform array of aeration tubes.

4. The method according to claim 1, wherein said free suspension mode is achieved by introducing gas into the liquid to generate gas-liquid mixture and adjusting the gas flowrate to change the density of gas-liquid mixture such that the light and heavy particles are suspended freely in the gas-liquid mixture.

5. The method according to claim 1, wherein said plurality of aeration tubes are configured so that the gas phase flows upward continuously or intermittently and said mixed particles are dispersed in said wastewater being treated.

6. The method according to claim 1, wherein the density of said light particles is uniform or non-uniform, wherein the size of said light particles is uniform or non-uniform, wherein the density of said heavy particles is uniform or non-uniform and wherein the size of said heavy particles is uniform or non-uniform.

7. The method according to claim 1, wherein said light particles include light particles of at least two different densities and/or at least two different sizes and said heavy particles include heavy particles of at least two types of densities and/or at least two different sizes.

8. The method according to claim 1, wherein the density of said light particles is higher than or equal to about 80% of the density of said wastewater being treated and lower than the density of said wastewater being treated, wherein the density of said heavy particles is higher than the density of said wastewater being treated and lower than or equal to about 120% of the density of said wastewater being treated, wherein volume fraction of the total volume of said light particles and said heavy particles is less than or equal to about 30% of the total volume of said gas-liquid-solid three-phase region.

* * * * *